(12) United States Patent
Tian et al.

(10) Patent No.: US 10,225,504 B2
(45) Date of Patent: Mar. 5, 2019

(54) DARK CURRENT REDUCTION IN IMAGE SENSORS VIA DYNAMIC ELECTRICAL BIASING

(71) Applicant: InVisage Technologies, Inc., Menlo Park, CA (US)

(72) Inventors: Hui Tian, Cupertino, CA (US); Pierre Henri Rene Della Nave, Mountain View, CA (US)

(73) Assignee: INVISAGE TECHNOLOGIES, INC., Newark, CA (US)

( * ) Notice: Subject to any disclaimer, the term of this patent is extended or adjusted under 35 U.S.C. 154(b) by 0 days.

(21) Appl. No.: 15/269,659

(22) Filed: Sep. 19, 2016

(65) Prior Publication Data
US 2017/0013218 A1    Jan. 12, 2017

Related U.S. Application Data

(62) Division of application No. 14/285,247, filed on May 22, 2014, now Pat. No. 9,451,188, which is a division
(Continued)

(51) Int. Cl.
*H04N 5/378* (2011.01)
*H04N 5/376* (2011.01)
(Continued)

(52) U.S. Cl.
CPC ........... *H04N 5/378* (2013.01); *H04N 5/2253* (2013.01); *H04N 5/3575* (2013.01); *H04N 5/361* (2013.01);
(Continued)

(58) Field of Classification Search
CPC .... H04N 5/378; H04N 5/3765; H04N 5/2253; H04N 5/3698; H04N 9/045;
(Continued)

(56) References Cited

U.S. PATENT DOCUMENTS

| 5,648,660 A | 7/1997 | Lee et al. |
| 5,717,458 A * | 2/1998 | Yonemoto ............... H04N 5/343 250/208.1 |

(Continued)

FOREIGN PATENT DOCUMENTS

WO    2008131313 A2    10/2008

OTHER PUBLICATIONS

Pain et al., "Reset Noise Suppression in Two-Dimensional CMOS Photodiode Pixels through Column-based Feedback-Reset", International Electron Devices Meeting, San Fransisco, Session 32.5, 4 pages, Dec. 8-11, 2002.
(Continued)

*Primary Examiner* — Albert H Cutler
(74) *Attorney, Agent, or Firm* — Kligler & Associates

(57) ABSTRACT

Image sensors and methods of using image sensors are disclosed. In an embodiment, the image sensor includes pixel regions having optically sensitive material (OSM). A bias voltage is provided to the OSM via a bias electrode for each pixel region. A pixel circuit (PC) for each pixel region includes a read out circuit and a charge store (CS) coupled to the OSM of the respective pixel region. The PC resets voltage on the CS to a reset voltage during a reset period, integrates charge from the OSM to the CS during an integration period, and reads out a signal from the CS during a read out period. The PC includes a reference voltage node coupled to the CS during the reset period and the read out circuit during the read out period, a reference voltage is applied to the reference voltage node and is varied during operation of the PC.

38 Claims, 20 Drawing Sheets

Related U.S. Application Data of application No. 13/051,983, filed on Mar. 18, 2011, now Pat. No. 8,736,733.

(60) Provisional application No. 61/315,822, filed on Mar. 19, 2010.

(51) Int. Cl.

| | | |
|---|---|---|
| *H04N 5/225* | (2006.01) | |
| *H04N 5/369* | (2011.01) | |
| *H04N 9/04* | (2006.01) | |
| *H04N 5/3745* | (2011.01) | |
| *H04N 5/361* | (2011.01) | |
| *H04N 5/357* | (2011.01) | |
| *H04N 5/363* | (2011.01) | |

(52) U.S. Cl.
CPC .......... *H04N 5/363* (2013.01); *H04N 5/3698* (2013.01); *H04N 5/3745* (2013.01); *H04N 5/3765* (2013.01); *H04N 9/045* (2013.01); *H04N 2209/047* (2013.01)

(58) Field of Classification Search
CPC .... H04N 5/3745; H04N 5/361; H04N 5/3575; H04N 5/363; H04N 2209/047
See application file for complete search history.

(56) References Cited

U.S. PATENT DOCUMENTS

| | | | |
|---|---|---|---|
| 6,133,862 A | 10/2000 | Dhuse et al. | |
| 6,317,154 B2 | 11/2001 | Beiley et al. | |
| 6,493,030 B1 | 12/2002 | Kozlowski et al. | |
| 6,911,640 B1 | 6/2005 | Bencuya et al. | |
| 7,078,670 B2 | 7/2006 | Atlas et al. | |
| 7,561,194 B1 | 7/2009 | Luo et al. | |
| 7,773,404 B2 | 8/2010 | Sargent et al. | |
| 7,923,801 B2 | 4/2011 | Tian et al. | |
| 7,923,802 B2 | 4/2011 | Tian et al. | |
| 8,223,234 B2 | 7/2012 | Inuiya et al. | |
| 8,736,733 B2 | 5/2014 | Tian et al. | |
| 9,451,188 B2 | 9/2016 | Tian et al. | |
| 9,456,159 B1 | 9/2016 | Hynecek | |
| 9,491,383 B2 | 11/2016 | Boisvert et al. | |
| 9,871,160 B2 | 1/2018 | Tian et al. | |
| 2002/0017612 A1 | 2/2002 | Yu et al. | |
| 2004/0119853 A1 | 6/2004 | Kokubun et al. | |
| 2004/0160522 A1 | 8/2004 | Fossum et al. | |
| 2004/0174449 A1* | 9/2004 | Lee .................... | H04N 5/3597 348/308 |
| 2005/0104089 A1* | 5/2005 | Engelmann .......... | H04N 5/3651 257/204 |
| 2005/0205879 A1 | 9/2005 | Fukunaga | |
| 2005/0248674 A1* | 11/2005 | Mabuchi .............. | H04N 5/3658 348/308 |
| 2006/0181629 A1 | 8/2006 | Miyashita et al. | |
| 2007/0051943 A1 | 3/2007 | Lee et al. | |
| 2007/0052055 A1 | 3/2007 | McKee | |
| 2007/0076093 A1 | 4/2007 | Misawa | |
| 2007/0076108 A1 | 4/2007 | Misawa | |
| 2007/0132052 A1 | 6/2007 | Sargent et al. | |
| 2007/0164333 A1 | 7/2007 | Wright | |
| 2007/0228503 A1* | 10/2007 | Yokoyama ........ | H01L 27/14667 257/431 |
| 2008/0173964 A1 | 7/2008 | Akram | |
| 2008/0284884 A1 | 11/2008 | Makino et al. | |
| 2009/0027529 A1* | 1/2009 | Jung ................. | H01L 27/14609 348/294 |
| 2009/0290059 A1* | 11/2009 | Suzuki .............. | H01L 27/14603 348/308 |
| 2010/0002113 A1* | 1/2010 | Ota .................... | H01L 27/14632 348/297 |
| 2010/0053386 A1* | 3/2010 | Sizukuisi ............... | H04N 5/361 348/273 |
| 2010/0060769 A1* | 3/2010 | Inuiya ............... | H01L 27/14623 348/311 |
| 2010/0140732 A1 | 6/2010 | Eminoglu et al. | |
| 2010/0201856 A1 | 8/2010 | Hayashi et al. | |
| 2010/0276670 A1 | 11/2010 | Shen et al. | |
| 2011/0049665 A1 | 3/2011 | Goto | |
| 2011/0069210 A1 | 3/2011 | Ogura et al. | |
| 2011/0216212 A1 | 9/2011 | Watanabe et al. | |
| 2011/0228144 A1 | 9/2011 | Tian et al. | |
| 2012/0074297 A1 | 3/2012 | Yonekura et al. | |
| 2012/0173175 A1 | 7/2012 | Devicharan et al. | |
| 2012/0200752 A1 | 8/2012 | Matsunaga et al. | |
| 2012/0268635 A1 | 10/2012 | Furuta et al. | |
| 2013/0075593 A1 | 3/2013 | Williams et al. | |
| 2013/0208157 A1 | 8/2013 | Bechtel et al. | |
| 2013/0277536 A1 | 10/2013 | Mizuno et al. | |
| 2014/0054466 A1 | 2/2014 | Kurokawa et al. | |
| 2014/0131554 A1 | 5/2014 | Ishii et al. | |
| 2014/0146211 A1 | 5/2014 | Mori et al. | |
| 2014/0175591 A1 | 6/2014 | Tian et al. | |
| 2014/0284663 A1 | 9/2014 | Meinhold et al. | |
| 2014/0313386 A1 | 10/2014 | Jiang et al. | |
| 2015/0015747 A1 | 1/2015 | Hizi | |
| 2015/0015759 A1 | 1/2015 | Kavakan et al. | |
| 2015/0070544 A1 | 3/2015 | Smith et al. | |
| 2015/0304582 A1 | 10/2015 | Hirota | |
| 2015/0319386 A1 | 11/2015 | Brady et al. | |
| 2015/0357360 A1 | 12/2015 | Tian et al. | |
| 2016/0037070 A1 | 2/2016 | Mandelli et al. | |
| 2016/0037099 A1 | 2/2016 | Mandelli et al. | |
| 2016/0037114 A1 | 4/2016 | Mandelli et al. | |
| 2016/0155882 A1 | 6/2016 | Tian et al. | |
| 2017/0013218 A1 | 1/2017 | Tian et al. | |
| 2017/0054928 A1 | 2/2017 | Boisvert et al. | |
| 2017/0201693 A1 | 7/2017 | Sugizaki et al. | |
| 2017/0208273 A1 | 7/2017 | Mandelli et al. | |
| 2017/0264836 A1 | 9/2017 | Mandelli et al. | |
| 2018/0175102 A1 | 6/2018 | Togashi et al. | |

OTHER PUBLICATIONS

U.S. Appl. No. 14/815,020 Office action dated Oct. 18, 2017.
International Application # PCT/US2017/043410 search report dated Dec. 1, 2017.
International Application # PCT/US2017/057093 search report dated Jan. 16, 2018.
International Application # PCT/US2017/057090 search report dated Jan. 12, 2018.
International Application # PCT/US17/57094 search report dated Jan. 17, 2018.
Fowler et al., "Low Noise Readout using Active Reset for CMOS APS", Proceedings SPIE, vol. 3965, 10 pages, year 2000.
Kozlowski et al., "Pixel Noise Suppression via SoC Management of Tapered Reset in a 1920x1080 CMOS Image Sensor", IEEE Journal of Solid-State Circuits, vol. 40, 42 pages, Jan. 2006.
Ishii et al., "An Ultra-low Noise Photoconductive Film Image Sensor With a High-speed Column Feedback Amplifier Noise Canceller", Dig. VLSI Circuits, pp. C8-C9, Jun. 2013.
Kapusta et al., "Sampling Circuits That Break the kT/C Thermal Noise Limit", IEEE Journal of Solid-State Circuits, vol. 49, No. 8, pp. 1694-1701, Aug. 2014.
U.S. Appl. No. 15/657,068 office action dated Oct. 18, 2018.

* cited by examiner

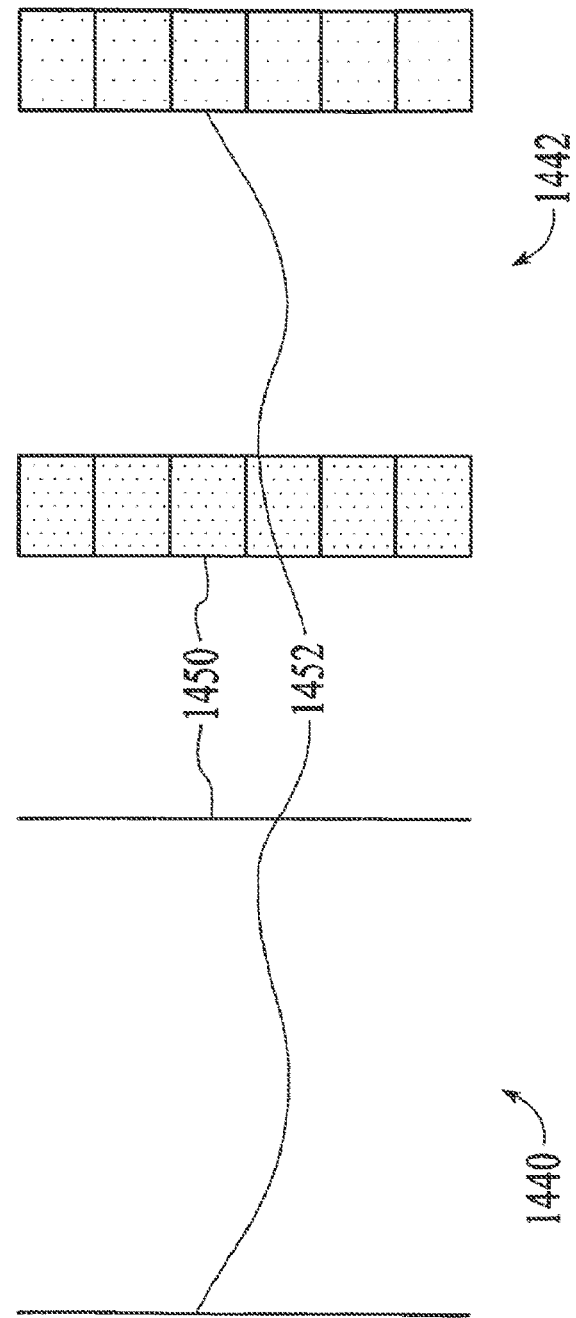

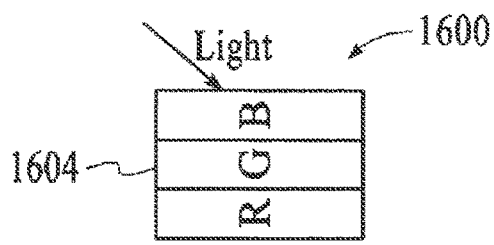
FIG. 4A
FIG. 4B
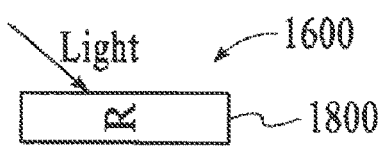
FIG. 4C
FIG. 4D
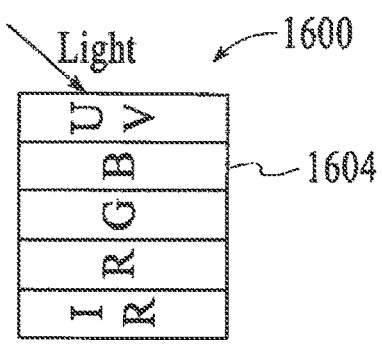
FIG. 4E
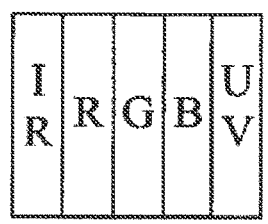
FIG. 4F

DARK CURRENT REDUCTION IN IMAGE SENSORS VIA DYNAMIC ELECTRICAL BIASING

CROSS-REFERENCE TO RELATED APPLICATIONS

This application is a divisional of and claims the benefit of priority of U.S. patent application Ser. No. 14/285,247, entitled "DARK CURRENT REDUCTION IN IMAGE SENSORS VIA DYNAMIC ELECTRICAL BIASING," filed May 22, 2014, which is a divisional of and claims the benefit of priority of U.S. patent application Ser. No. 13/051,983, entitled "Dark Current Reduction in Image Sensors Via Dynamic Electrical Biasing," filed Mar. 18, 2011, which claims priority benefit of U.S. Provisional Application No. 61/315,822, entitled "Effective Dark Current Reduction in Photodetectors via Dynamic Electrical Biasing Enabled by the use of Floating Photodetectors," filed Mar. 19, 2010, each of which is hereby incorporated by reference in its entirety. Each patent, patent application, and/or publication mentioned in this specification is hereby incorporated by reference in its entirety to the same extent as if each individual patent, patent application, and/or publication was specifically and individually indicated to be incorporated by reference.

TECHNICAL FIELD

The inventive subject matter generally relates to optical and electronic devices, systems and methods that include optically sensitive material, such as nanocrystals or other optically sensitive material, and methods of making and using the devices and systems.

BRIEF DESCRIPTION OF THE FIGURES

The systems and methods described herein may be understood by reference to the following figures:

FIG. 3B shows an aspect of a open simple geometrical arrangement of pixels;

FIG. 4A shows a Bayer filter pattern;

FIG. 4B-4F show examples of some alternative pixel layouts;

Figure 1:
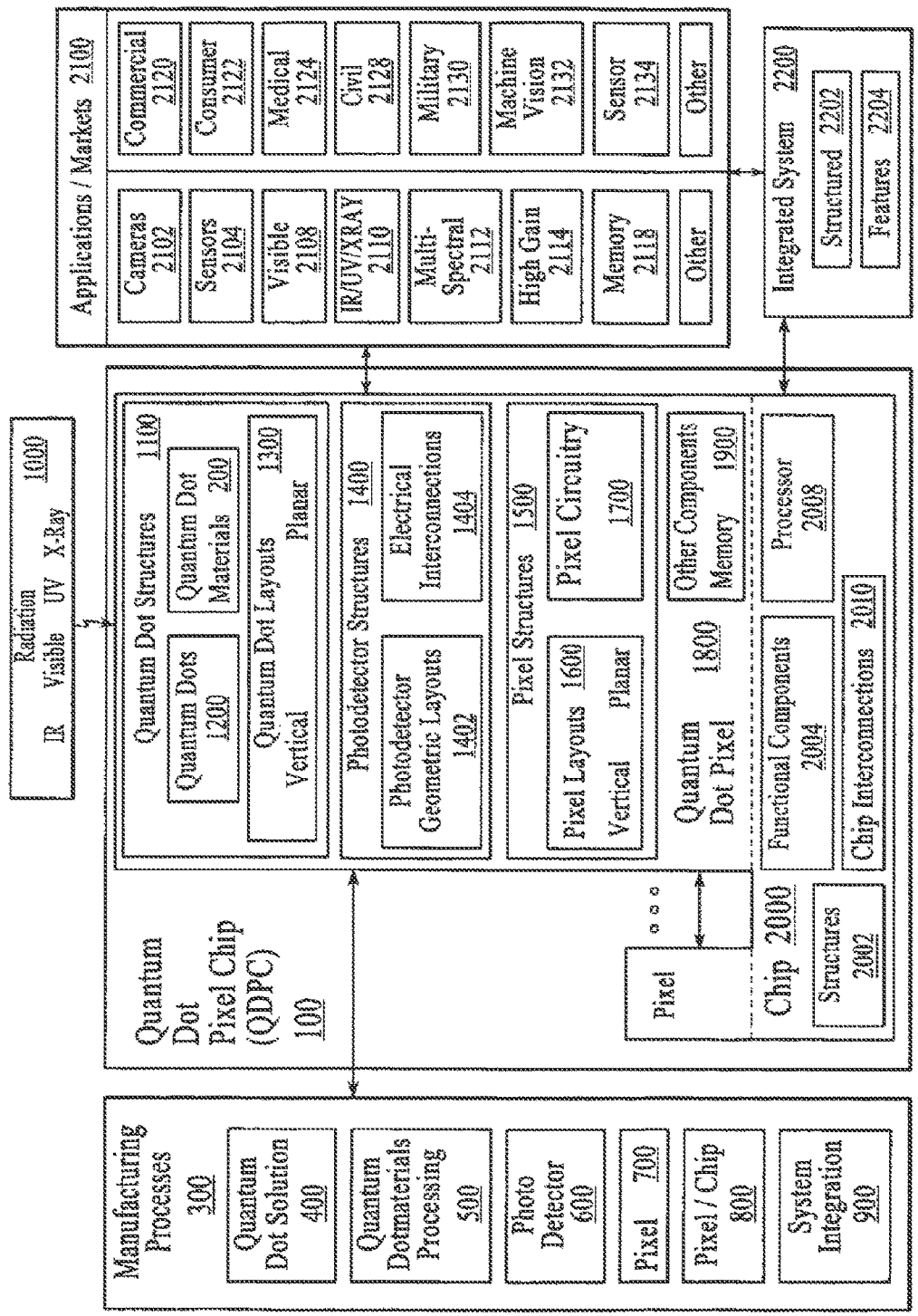
FIG. 1 shows overall structure and areas according to an embodiment.

Embodiments are described, by way of example only, with reference to the accompanying drawings. The drawings are not necessarily to scale. For clarity and conciseness, certain features of the embodiment may be exaggerated and shown in schematic form.

DETAILED DESCRIPTION

Embodiments include an image sensor comprising a semiconductor substrate; a plurality of pixel regions, each pixel region comprising an optically sensitive material over the substrate, the optically sensitive material positioned to receive light; a bias electrode for each pixel region, the bias electrode configured to provide a bias voltage to the optically sensitive material of the respective pixel region; a pixel circuit for each pixel region, each pixel circuit comprising a charge store formed on the semiconductor substrate and a read out circuit, the charge store in electrical communication with the optically sensitive material of the respective pixel region; the pixel circuit configured to reset the voltage on the charge store to a reset voltage during a reset period; the pixel circuit configured to integrate charge from the optically sensitive material to the charge store during an integration period; the pixel circuit configured to read out a signal from the charge store during a read out period; and the pixel circuit including a reference voltage node configured to be coupled to the charge store during the reset period and the read out circuit during the read out period; wherein a reference voltage applied to the reference voltage node is configured to be varied during the operation of the pixel circuit.

Embodiments include an image sensor wherein the reference voltage is varied between the reset period and the read out period.

Embodiments include an image sensor wherein the reference voltage is set to a first level during the reset period and a second level during the read out period and wherein the first level is lower than the second level.

Embodiments include an image sensor wherein the reference voltage is varied between the reset period and the integration period.

Embodiments include an image sensor wherein the reference voltage is set to a first level during the reset period and a second level during the integration.

Embodiments include an image sensor wherein the reference voltage is varied during the read out period.

Embodiments include an image sensor wherein the pixel circuit is configured to perform correlated double sampling during the read out period.

Embodiments include an image sensor wherein the reference voltage during the reset period is within the range of about 1 volt to −1 volt relative to a substrate potential of the semiconductor substrate.

Embodiments include an image sensor wherein the reference voltage during the reset period is substantially the same as a substrate potential of the semiconductor substrate.

Embodiments include an image sensor wherein the reference voltage during the reset period is less than 3 volts.

Embodiments include an image sensor wherein the reference voltage during the reset period is less than 2 volts.

Embodiments include an image sensor wherein the reference voltage during the reset period is less than 1 volt.

Embodiments include an image sensor wherein the reference voltage is 0 volts.

Embodiments include an image sensor wherein the pixel circuit includes a reset transistor between the reference voltage node and the charge store.

Embodiments include an image sensor wherein the reset transistor is open during the reset period and closed during the integration period.

Embodiments include an image sensor wherein the reset transistor is closed during a portion of the read out period and open during a portion of the read out period.

Embodiments include an image sensor wherein the read out circuit includes a read out transistor and a select transistor for selectively coupling the read out transistor to a read out line, wherein the reference voltage node is coupled to the read out transistor.

Embodiments include an image sensor wherein the read out transistor is a source follower and the voltage reference node is coupled to the source of the read out transistor.

Embodiments include an image sensor wherein the read out transistor has a threshold voltage less than 1 volt.

Embodiments include an image sensor wherein the read out transistor has a threshold voltage equal to the reset voltage.

Embodiments include an image sensor wherein the select transistor is closed during the integration period and open during the read out period.

Embodiments include an image sensor wherein the bias voltage applied by the bias electrode during the integration period is greater than the reset voltage.

Embodiments include an image sensor wherein the bias voltage applied by the bias electrode during the integration period is greater than the first level of voltage applied to the reference voltage node and is less than the second level of voltage applied to the reference voltage node.

Embodiments include an image sensor wherein the bias voltage is varied during the operation of the pixel circuit.

Embodiments include an image sensor wherein the bias voltage is set to a first level during the reset period and to a second level during the read out period, wherein the second level is greater than the first level.

Embodiments include an image sensor wherein the bias voltage is set to a first level during the integration period and to a second level during the read out period, wherein the second level is greater than the first level.

Embodiments include an image sensor wherein the first level of the bias voltage is 3 volts or less.

Embodiments include an image sensor wherein the second level of the bias voltage is within the range of 3 volts to 5 volts.

Embodiments include an image sensor wherein the bias voltage and the pixel circuit are configured to cause the optically sensitive material to act as a current source to the charge store during the integration period.

Embodiments include an image sensor wherein the voltage of the charge store increases during the integration period.

Embodiments include an image sensor wherein the bias voltage and the pixel circuit are configured to cause the voltage of the charge store to increase by 3 volts or less during the integration period.

Embodiments include an image sensor wherein the bias voltage and the pixel circuit are configured to cause the voltage of the charge store to increase by 1 volt or less during the integration period.

Embodiments include an image sensor wherein the bias voltage is increased during the read out period to increase the voltage of the charge store for read out.

Embodiments include an image sensor wherein the charge store comprises a diode formed in the semiconductor substrate.

Embodiments include an image sensor further comprising a pixel electrode between the optically sensitive material and the charge store.

Embodiments include an image sensor wherein the pixel circuit is configured to vary the voltage of the pixel electrode relative to a substrate potential of the semiconductor substrate during the operation of the pixel circuit.

Embodiments include an image sensor wherein the bias voltage is configured to be varied relative to a substrate potential of the semiconductor substrate during the operation of the pixel circuit.

Embodiments include an image sensor wherein the bias voltage and the voltage of the pixel electrode are configured to be varied relative to a substrate potential of the semiconductor substrate independently of one another during the operation of the pixel circuit.

Embodiments include an image sensor wherein the bias electrode is a common electrode for the plurality of pixel regions.

Embodiments include an image sensor comprising a semiconductor substrate; a plurality of pixel regions, each pixel region comprising an optically sensitive material over the substrate, the optically sensitive material positioned to receive light; a bias electrode for each pixel region, the bias electrode configured to provide a bias voltage to the optically sensitive material of the respective pixel region; a pixel circuit for each pixel region, each pixel circuit comprising a charge store formed on the semiconductor substrate and a read out circuit, the charge store in electrical communication with the optically sensitive material of the respective pixel region; the pixel circuit configured to reset the voltage on the charge store to a reset voltage during a reset period; the pixel circuit configured to integrate charge from the optically sensitive material to the charge store during an integration period; and the pixel circuit configured to read out a signal from the charge store during a read out period; wherein the bias voltage during the integration period is greater than the reset voltage.

Embodiments include an image sensor wherein the reset voltage is within the range of 1 volt to −1 volt relative to a substrate potential of the semiconductor substrate.

Embodiments include an image sensor wherein the reset voltage is substantially the same as a substrate potential of the semiconductor substrate.

Embodiments include an image sensor wherein reset voltage is less than 3 volts.

Embodiments include an image sensor wherein the reset voltage is less than 2 volts.

Embodiments include an image sensor wherein the reset voltage is less than 1 volt.

Embodiments include an image sensor wherein the reset voltage is 0 volts.

Embodiments include an image sensor wherein the pixel circuit includes a reset transistor between a reference voltage node and the charge store.

Embodiments include an image sensor wherein the reset transistor is open during the reset period and closed during the integration period.

Embodiments include an image sensor wherein the reset transistor is closed during a portion of the read out period and open during a portion of the read out period.

Embodiments include an image sensor wherein the read out circuit includes a read out transistor and a select transistor for selectively coupling the read out transistor to a read out line.

Embodiments include an image sensor wherein the read out transistor is a source follower and a voltage reference node is coupled to the source of the read out transistor.

Embodiments include an image sensor wherein the read out transistor has a threshold voltage less than 1 volt.

Embodiments include an image sensor wherein the read out transistor has a threshold voltage equal to the reset voltage.

Embodiments include an image sensor wherein the select transistor is closed during the integration period and open during the read out period.

Embodiments include an image sensor wherein the bias voltage is varied during the operation of the pixel circuit.

Embodiments include an image sensor wherein the bias voltage is set to a first level during the reset period and to a second level during the read out period, wherein the second level is greater than the first level.

Embodiments include an image sensor wherein the pixel circuit is configured to perform correlated double sampling during the read out period.

Embodiments include an image sensor wherein the bias voltage is set to a first level during the integration period and to a second level during the read out period, wherein the second level is greater than the first level. Embodiments include an image sensor wherein the first level of the bias voltage is 3 volts or less.

Embodiments include an image sensor wherein the second level of the bias voltage is within the range of 3 volts to 5 volts.

Embodiments include an image sensor wherein the bias voltage and the pixel circuit are configured to cause the optically sensitive material to act as a current source to the charge store during the integration period.

Embodiments include an image sensor wherein the voltage of the charge store increases during the integration period.

Embodiments include an image sensor wherein the bias voltage and the pixel circuit are configured to cause the voltage of the charge store to increase by 3 volts or less during the integration period.

Embodiments include an image sensor wherein the bias voltage and the pixel circuit are configured to cause the voltage of the charge store to increase by 1 volt or less during the integration period.

Embodiments include an image sensor wherein the bias voltage is increased during the read out period to increase the voltage of the charge store for read out.

Embodiments include an image sensor wherein the charge store comprises a diode formed in the semiconductor substrate.

Embodiments include an image sensor further comprising a pixel electrode between the optically sensitive material and the charge store.

Embodiments include an image sensor wherein the pixel circuit is configured to vary the voltage of the pixel electrode relative to a substrate potential of the semiconductor substrate during the operation of the pixel circuit.

Embodiments include an image sensor wherein the bias voltage is configured to be varied relative to a substrate potential of the semiconductor substrate during the operation of the pixel circuit.

Embodiments include an image sensor wherein the bias voltage and the voltage of the pixel electrode are configured to be varied relative to a substrate potential of the semiconductor substrate independently of one another during the operation of the pixel circuit.

Embodiments include an image sensor wherein the bias electrode is a common electrode for the plurality of pixel regions.

Embodiments include an image sensor comprising: a semiconductor substrate; a plurality of pixel regions, each pixel region comprising an optically sensitive material over the substrate, the optically sensitive material positioned to receive light; a bias electrode for each pixel region, the bias electrode configured to provide a bias voltage to the optically sensitive material of the respective pixel region; a pixel circuit for each pixel region, each pixel circuit comprising a charge store formed on the semiconductor substrate and a read out circuit, the charge store in electrical communication with the optically sensitive material of the respective pixel region; the pixel circuit configured to reset the voltage on the charge store to a reset voltage during a reset period; the pixel circuit configured to discharge charge from the charge store to the optically sensitive material during an integration period; and the pixel circuit configured to read out a signal from the charge store during a read out period; wherein the bias voltage is configured to change from a first level during the reset period to a second level during the integration period.

Embodiments include an image sensor wherein the first level of the bias voltage is greater than the second level of the bias voltage.

Embodiments include an image sensor wherein the bias voltage is configured to change from the second level during the integration period to a third level during the read out period.

Embodiments include an image sensor wherein the third level of the bias voltage is greater than the second level of the bias voltage.

Embodiments include an image sensor wherein the third level of the bias voltage is equal to the first level of the bias voltage.

Embodiments include an image sensor wherein the first level of the bias voltage is lower than the reset voltage.

Embodiments include an image sensor wherein the voltage of the charge store is reduced from the reset voltage to a lower starting voltage for integration.

Embodiments include an image sensor wherein the voltage of the charge store is increased during the read out period for read out.

Embodiments include an image sensor wherein the first level of the bias voltage is less than 2 volts.

Embodiments include an image sensor wherein the first level of the bias voltage is less than 1 volts.

Embodiments include an image sensor wherein the first level of the bias voltage is 0 volts.

Embodiments include an image sensor wherein the second level of the bias voltage is less than 0 volts.

Embodiments include an image sensor wherein the second level of the bias voltage is less than −1 volts.

Embodiments include an image sensor wherein the second level of the bias voltage is 2 volts or less.

Embodiments include an image sensor wherein the third level of the bias voltage is less than 2 volts.

Embodiments include an image sensor wherein the third level of the bias voltage is 0 volts.

Embodiments include an image sensor wherein reset voltage is greater than 1 volt.

Embodiments include an image sensor wherein the reset voltage is greater than 2 volts.

Embodiments include an image sensor wherein the reset voltage is greater than 3 volts.

Embodiments include an image sensor wherein the reset voltage is less than 5 volts.

Embodiments include an image sensor wherein the reset voltage is less than 3 volts.

Embodiments include an image sensor wherein the starting voltage of the charge store for integration is less than 3 volt.

Embodiments include an image sensor wherein the starting voltage of the charge store for integration is less than 2 volt.

Embodiments include an image sensor wherein the starting voltage of the charge store for integration is less than 1 volt.

Embodiments include an image sensor wherein the voltage of the charge store decreases during the integration period.

Embodiments include an image sensor wherein the bias voltage and the pixel circuit are configured to cause the voltage of the charge store to decrease by 3 volts or less during the integration period.

Embodiments include an image sensor wherein the pixel circuit is configured to perform correlated double sampling during the read out period.

Embodiments include an image sensor wherein the charge store comprises a diode formed in the semiconductor substrate.

Embodiments include an image sensor further comprising a pixel electrode between the optically sensitive material and the charge store.

Embodiments include an image sensor wherein the pixel circuit is configured to vary the voltage of the pixel electrode relative to a substrate potential of the semiconductor substrate during the operation of the pixel circuit.

Embodiments include an image sensor wherein the bias voltage is configured to be varied relative to a substrate potential of the semiconductor substrate during the operation of the pixel circuit.

Embodiments include an image sensor wherein the bias voltage and the voltage of the pixel electrode are configured to be varied relative to a substrate potential of the semiconductor substrate independently of one another during the operation of the pixel circuit.

Embodiments include an image sensor wherein the bias electrode is a common electrode for the plurality of pixel regions.

Embodiments include an image sensor comprising: a semiconductor substrate; a plurality of pixel regions, each pixel region comprising an optically sensitive material over the substrate, the optically sensitive material positioned to receive light; a bias electrode for each pixel region, the bias electrode configured to provide a bias voltage to the optically sensitive material of the respective pixel region; a pixel circuit for each pixel region, each pixel circuit comprising a charge store formed on the semiconductor substrate and a read out circuit, the charge store in electrical communication with the optically sensitive material of the respective pixel region; and the pixel circuit configured to read out a first signal from the charge store after a first integration period and to read out a second signal from the charge store after a second integration period, wherein the bias voltage is varied between the first integration period and the second integration period.

Embodiments include an image sensor wherein the bias voltage during the first integration period is equal to the reset voltage.

Embodiments include an image sensor wherein the bias voltage during the first integration period is selected such that there is substantially no bias between the bias electrode and the charge store during the first integration period.

Embodiments include an image sensor wherein the first signal is indicative of a level of dark current generated by the optically sensitive material.

Embodiments include an image sensor wherein the second signal depends on the intensity of light incident on the optically sensitive material during the second integration period.

Embodiments include an image sensor further comprising circuitry for generating a pixel value based on the first signal and the second signal.

Embodiments include an image sensor further comprising circuitry for generating a pixel value by adjusting the first signal based on the second signal.

Embodiments include an image sensor further comprising circuitry for generating a pixel value by generating a first value based on the first signal, generating a second value based on the second signal and subtracting the first value from the second value.

Embodiments include an image sensor wherein the first integration period is equal to the second integration period.

Embodiments include an image sensor wherein the first integration period is shorter than the second integration period.

Embodiments include an image sensor wherein the first integration period is less than or equal to half of the second integration period.

Embodiments include an image sensor wherein the charge store comprises a diode formed in the semiconductor substrate.

Embodiments include an image sensor wherein the bias electrode is a common electrode for the plurality of pixel regions.

Embodiments include an image sensor wherein the optically sensitive material comprises monodisperse nanocrystals.

Embodiments include an image sensor wherein the optically sensitive material comprises a continuous film of interconnected nanocrystal particles in contact with the electrode and the charge store for the respective pixel region.

Embodiments include an image sensor wherein the nanocrystal particles comprise a plurality of nanocrystal cores and a shell over the plurality of nanocrystal cores.

Embodiments include an image sensor wherein the plurality of nanocrystal cores is fused.

Embodiments include an image sensor wherein the plurality of nanocrystal cores is electrically interconnected with linker molecules.

Embodiments include a method for detecting an image comprising: resetting the voltage of a charge store to a reset voltage during a reset period; applying a bias voltage across an optically sensitive material during an integration period; varying the charge on the charge store during the integration period based on the intensity of light incident on the optically sensitive material during the integration period; reading out a signal from the charge store during a read out period; varying a reference voltage on a reference voltage node; wherein the reference voltage on the reference voltage node is used to reset the voltage of the charge store during the reset period; and wherein the reference voltage on the reference voltage node is used for read out of the signal from the charge store during the read out period.

Embodiments include a method wherein the reference voltage is varied between the reset period and the read out period.

Embodiments include a method wherein the reference voltage is set to a first level during the reset period and a second level during the read out period and wherein the first level is lower than the second level.

Embodiments include a method wherein the reference voltage is varied between the reset period and the integration period.

Embodiments include a method wherein the reference voltage is varied during the read out period.

Embodiments include a method wherein the bias voltage applied during the integration period is greater than the reset voltage.

Embodiments include a method wherein the bias voltage applied during the integration period is greater than the first level of voltage applied to the reference voltage node and is less than the second level of voltage applied to the reference voltage node.

Embodiments include a method wherein the bias voltage is varied between the reset period and the read out period.

Embodiments include a method for detecting an image comprising: resetting the voltage of a charge store to a reset voltage during a reset period; applying a bias voltage across an optically sensitive material during an integration period; varying the charge on the charge store during the integration period based on the intensity of light incident on the optically sensitive material during the integration period; and reading out a signal from the charge store during a read out period; wherein the bias voltage during the integration period is greater than the reset voltage.

Embodiments include a method wherein the charge store comprises a diode formed in a semiconductor substrate.

Embodiments include a method wherein reset voltage is within the range of 1 volt to −1 volt relative to a substrate potential of the semiconductor substrate.

Embodiments include a method wherein the reset voltage is substantially the same as a substrate potential of the semiconductor substrate.

Embodiments include a method wherein the bias voltage is varied between the reset period and the read out period.

Embodiments include a method wherein the bias voltage and the voltage of the charge store are varied relative to a substrate potential of the semiconductor substrate independently of one another.

Embodiments include a method for detecting an image comprising: resetting the voltage of a charge store to a reset voltage during a reset period; applying a bias voltage across an optically sensitive material during an integration period; varying the charge on the charge store during the integration period based on the intensity of light incident on the optically sensitive material during the integration period; reading out a signal from the charge store during a read out period; and changing the bias voltage from a first level during the reset period to a second level during the integration period.

Embodiments include a method wherein the charge store comprises a diode formed in a semiconductor substrate.

Embodiments include a method wherein the first level of the bias voltage is greater than the second level of the bias voltage.

Embodiments include a method further comprising changing the bias voltage from the second level during the integration period to a third level during the read out period.

Embodiments include a method wherein the third level of the bias voltage is greater than the second level of the bias voltage.

Embodiments include a method wherein the third level of the bias voltage is equal to the first level of the bias voltage.

Embodiments include a method wherein the first level of the bias voltage is lower than the reset voltage.

Embodiments include a method further comprising reducing the voltage of the charge store from the reset voltage to a lower starting voltage for integration.

Embodiments include a method further comprising increasing the voltage of the charge store during the read out period for read out.

Embodiments include a method wherein the voltage of the charge store decreases during the integration period.

Embodiments include a method for detecting an image comprising: providing a charge store in electrical communication with an optically sensitive material; resetting the voltage of the charge store to a reset voltage during a reset period; reading out a first signal from the charge store after a first integration period; reading out a second signal from the charge store after a second integration period; varying a bias voltage across the optically sensitive material between the first integration period and the second integration period.

Embodiments include a method wherein the charge store comprises a diode formed in a semiconductor substrate.

Embodiments include a method wherein there is substantially no bias voltage across the optically sensitive during the first integration period such that the change in the charge of the charge store during the first integration period is indicative of a dark current of the optically sensitive material.

Embodiments include a method wherein a bias voltage is applied across the optically sensitive material during the second integration period such that the change in the charge of the charge store during the second integration period depends on the intensity of light incident on the optically sensitive material.

Embodiments include a method further comprising generating a pixel value based on the first signal and the second signal.

Figure 6:
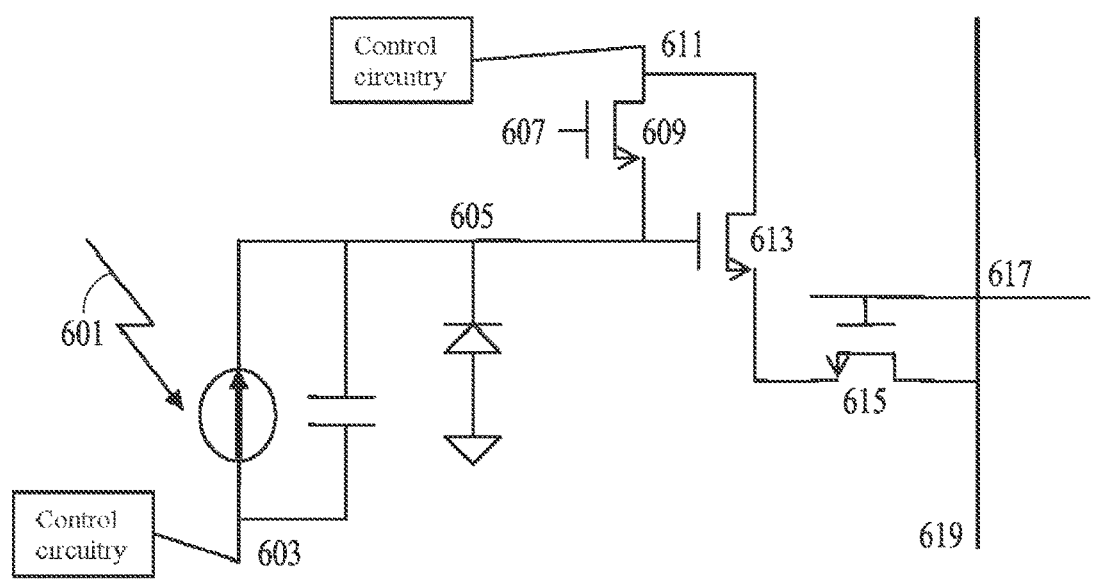
FIG. 6 is a circuit diagram of a specific embodiment of the floating-photodetector-enabled dynamic-biasing scheme disclosed herein.

FIG. 6 is a circuit diagram of a specific embodiment of the dynamic-biasing scheme disclosed herein. 601 is impinging light. The darkened ellipse containing a white arrow is the optically sensitive material, which serves as a current source, injecting current onto diode node. 603 may be termed a biasing electrode, an electrode that provides a bias voltage across the optically sensitive material. It may be implemented using, in embodiments, a metal grid (e.g., TiN) typically coplanar with the substrate surface and physically residing beneath the optically sensitive layer. It may be implemented using, in embodiments, a top transparent electrode. Control circuitry is used to vary the voltage or bias level of the bias electrode during operation of the pixel circuit. 605 is a diode that may also be termed a charge store. 607 is 'rst,' an electrode tied to the gate of transistor M1. 609 is the transistor M1, a reset transistor used to reset the diode to a reference voltage. 611 is 'VLEVEL,' also termed a reference voltage node or an electrode that ties to the drain of transistor M1, providing reference level or voltage. A control circuitry is used to vary the reference voltage level during operation of the pixel circuit (used for reset of the charge store and for the read out transistor). 613 is readout transistor M2. 615 is select transistor M3. 617 is 'sel,' an electrode ties to the gate of transistor M3. 619 is 'vcol,' a read out line or electrode that is shared among a group of pixels, used to send out pixel values.

Figure 7:
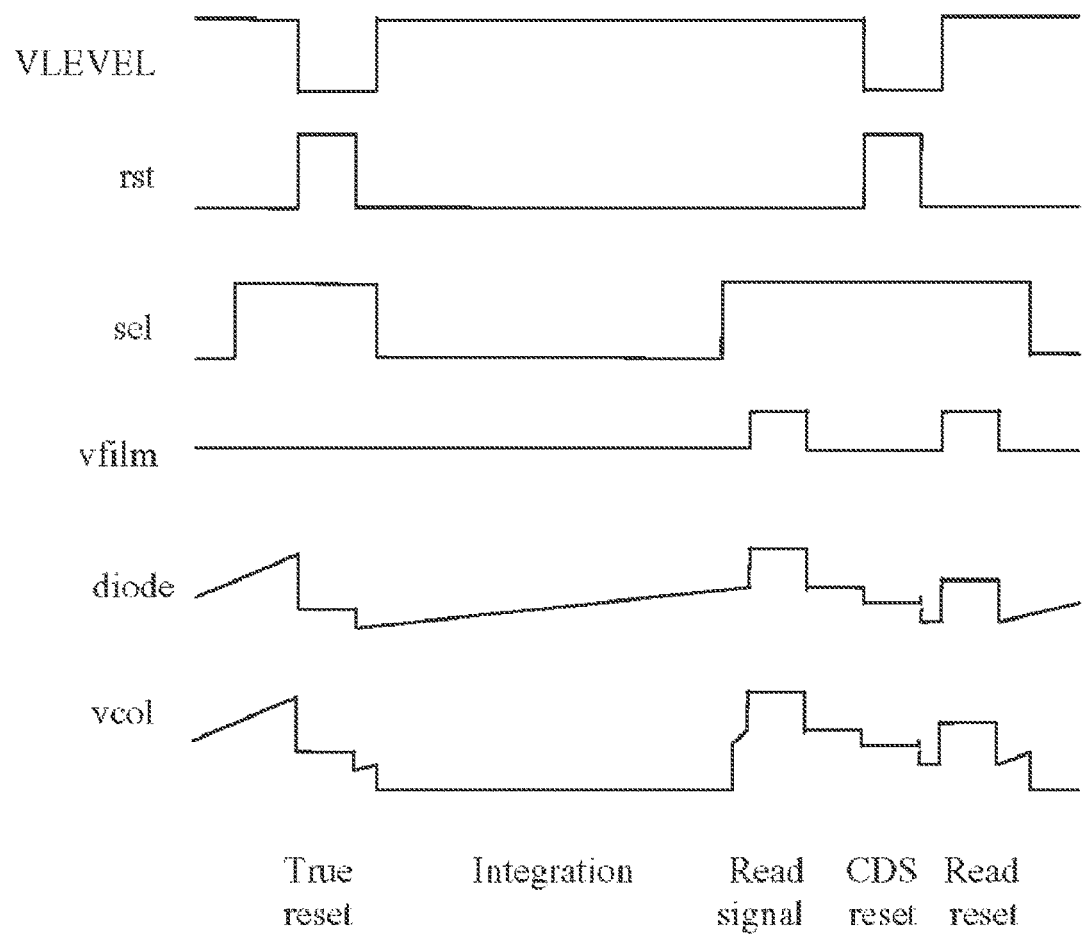
FIG. 7 is a timing diagram of a specific embodiment of the floating-photodetector-enabled dynamic biasing scheme disclosed herein.

FIG. 7 is a timing diagram that describes the operation of the specific embodiment disclosed in FIG. 6. During a first period labeled "True reset," the diode, or charge store, is reset to a known reference point, by setting the reset electrode to high voltage (turning on the reset transistor M1). In embodiments, during the reset phase, the electrode vfilm (i.e., the biasing electrode) is set to a bias voltage that is higher than diode voltage, for example 3V (normal range from −5V to 5V). The pixel electrode diode is driven to be a lower voltage, for example 0V (normal range from 0V to 5V). This is achieved by setting VLEVEL to a low voltage.

During a second period labeled "Integration," the electrode vfilm remains at the same voltage, for example 3V. Light induced photocurrent in the floating photodetector will drive the diode voltage higher. The photocurrent serves as a current source in this configuration. The use of a low voltage on the pixel electrode significantly suppresses the dark current of the pixel circuitry under a dark condition. VLEVEL is pulled back to high voltage such as 3V, to minimize leakage path of transistor M1, and to prepare for readout phase.

During a third period labeled "Read signal," the electrode vfilm is brought to a higher level, such as 5V (normal range −5V to 5V). This will boost up the diode voltage to make sure the low voltage at diode node can be read out through the readout circuit, and thus maintain dynamic range for the readout path. Alternatively, a low VT readout transistor M2 (for example, threshold of 0V, with range of −1V to 1V) can be used to read out the low voltage, in which case the pulsing on common electrode is not necessary.

During a fourth period labeled "CDS reset," the reset electrode goes high again, setting the diode voltage to the same known level. This is achieved by pulling VLEVEL to the same low voltage as in 'true reset' phase.

During a fifth period labeled "Read reset," VLEVEL is pulled back high to allow M2 functions as a readout transistor. This phase is used to readout the reset level.

Figure 8:
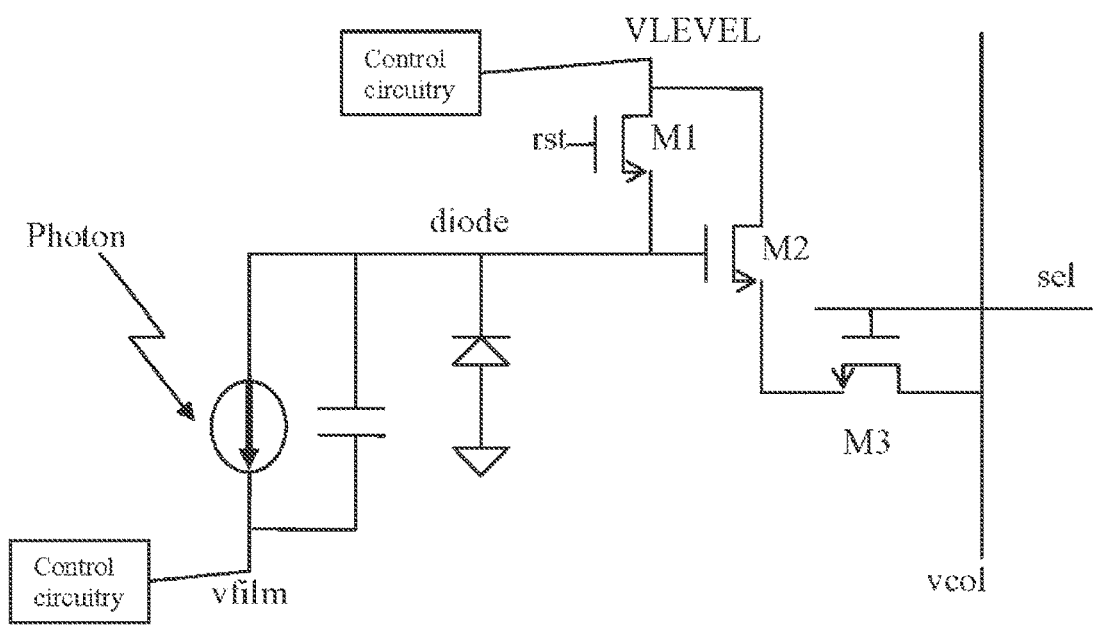
FIG. 8 is a circuit diagram of a second specific embodiment of the floating-photodetector-enabled dynamic-biasing scheme disclosed herein.

FIG. 8 is a circuit diagram of another specific embodiment of the dynamic-biasing scheme disclosed herein. It is the same or similar to the circuit diagram of FIG. 6, except that here the optically sensitive material serves as a current sink, pulling current out of diode node.

Figure 9:
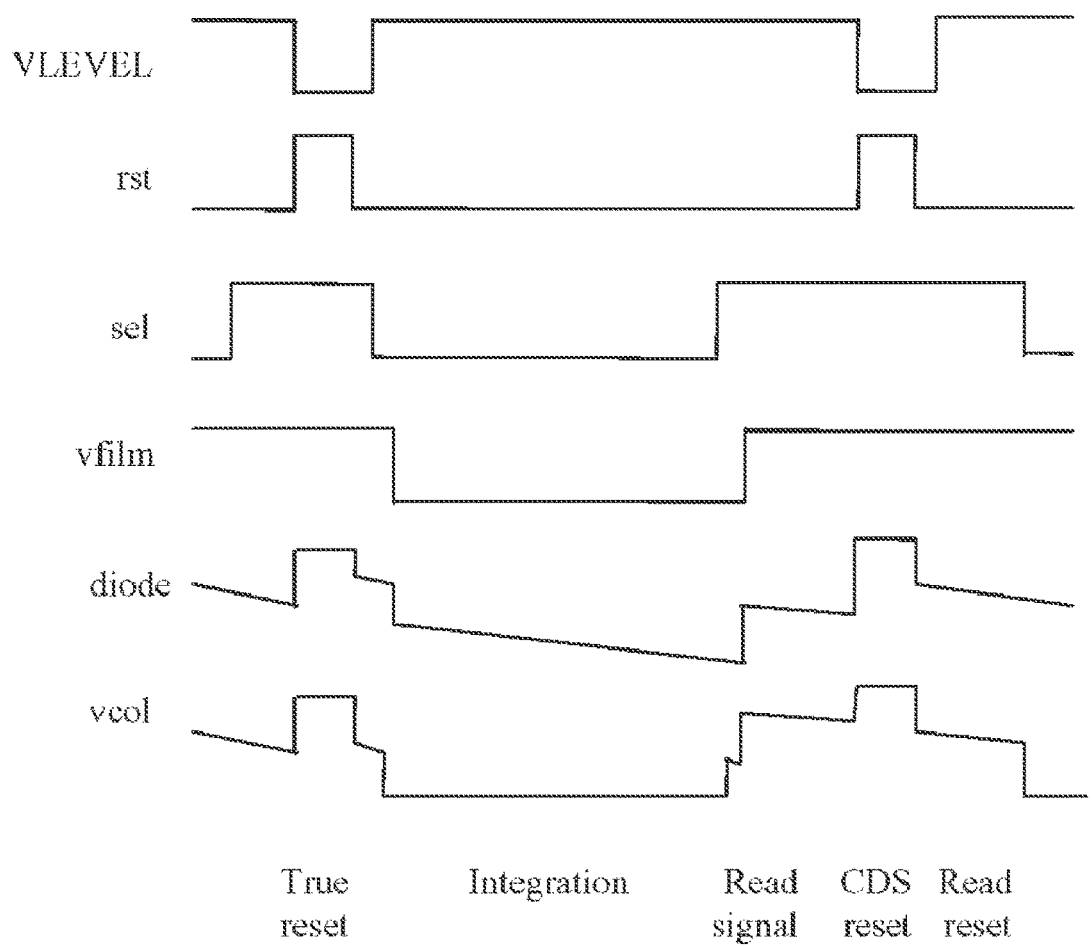
FIG. 9 is a timing diagram of a second specific embodiment of the floating-photodetector-enabled dynamic biasing scheme disclosed herein.

FIG. 9 is a timing diagram describes one specific embodiment of operating the circuit disclosed in FIG. 8. During a first period labeled "True reset," the diode is reset to a known reference point, by setting the reset electrode to high voltage (turning on transistor M1). In embodiments, during the reset phase, the electrode vfilm, which may be considered as a biasing electrode, is set to a voltage that is LOWER than diode voltage, for example 0V (normal range from −5V to 5V). The pixel electrode diode is driven to be a higher voltage, for example 2V (normal range from 0V to 5V). This is achieved by setting VLEVEL to an appropriate voltage, for example 2V.

During a second period labeled "Integration," the electrode vfilm is pulled lower, for example, to be −2V. This voltage drop of 2V will be capacitive coupled to diode node, pulling it down as well (for example, down to 1V). Light induced photocurrent in the floating photodetector will drive the diode voltage even lower. The photocurrent serves as a current sink in this configuration. The use of a lower voltage on the pixel electrode (1V, as opposed to 2V) suppresses the dark current of the pixel circuitry. VLEVEL is pulled back to high voltage such as 3V, to minimize leakage path of transistor M1, and to prepare for readout phase.

During a third period labeled "Read signal," the electrode vfilm is brought back to the same higher level as in phase 'True reset.' This will boost up the diode voltage, back to the original voltage such as 2V (minus photo current caused voltage drop). This is to make sure the low voltage at diode node can be read out through the readout circuit, and thus maintain dynamic range for the readout path. By dynamically pulling vfilm high-low-high, the integration operates with lower voltage on diode, while readout operates with higher voltage on diode.

During a fourth period labeled "CDS reset," the reset electrode goes high again, setting the diode voltage to the same known level. This is achieved by pulling VLEVEL to the same low voltage as in 'true reset' phase.

During a fifth period labeled "Read reset," VLEVEL is pulled back high to allow M2 functions as a readout transistor. This phase is used to readout the reset level.

Figure 10:
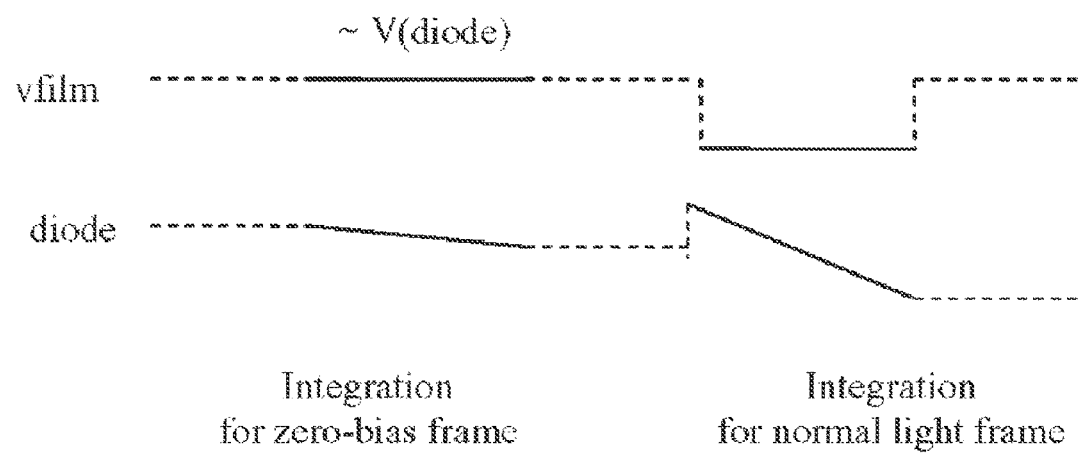
FIG. 10 is a timing diagram of a third specific embodiment of the floating-photodetector-enabled dynamic biasing scheme disclosed herein, i.e. "zero-bias frame subtraction."

FIG. 10 is a timing diagram of a third specific embodiment of the floating-photodetector-enabled dynamic biasing scheme disclosed herein, i.e., "zero-bias frame subtraction." In embodiments, the image frame time is divided into two sections. The first section is for '0-bias frame,' and the second section is for 'normal light frame'. During '0-bias frame,' the vfilm voltage (vfilm may be considered as a biasing electrode) is set to be the same as diode voltage. This will make the film not sensitive to light; hence the readout signal during this section is dominated by silicon dark current.

Figure 11:
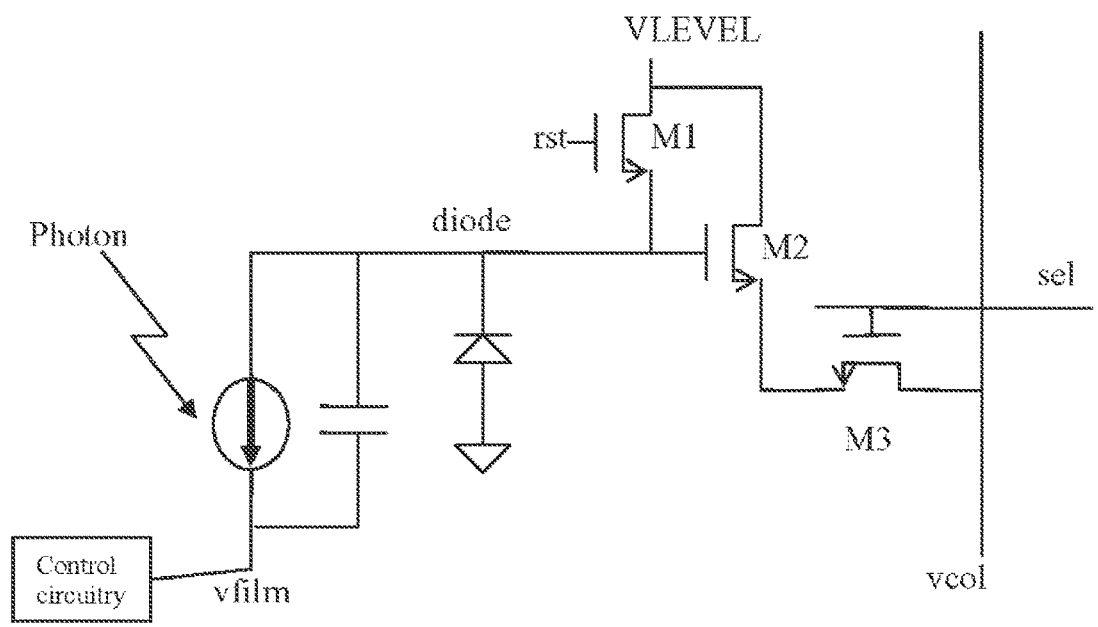
FIG. 11 shows a schematic of an example embodiment of the circuit to implement the method described in FIG. 10.

FIG. 11 is one specific embodiment of the circuit to implement the method described in FIG. 10. It can be the same as or similar to the circuits used in FIG. 6 or FIG. 8. In this example, it is similar to the circuit of FIG. 8, except that here for simplicity the control circuitry is removed from VLEVEL electrode (the reference voltage node). VLEVEL (the reference voltage) is held constant in this example.

Figure 12:
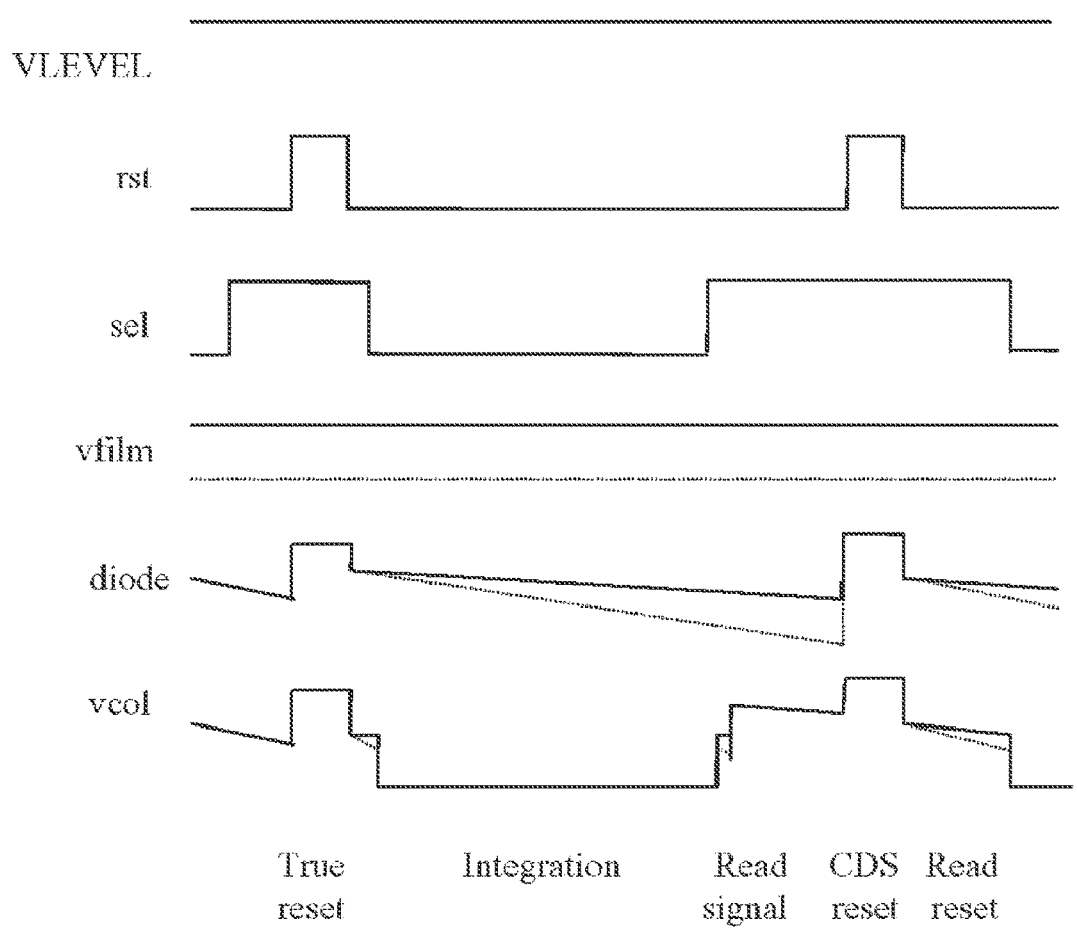
FIG. 12 is a timing diagram of one of the specific embodiments for each of the two frames described in FIG. 10.
Figure 13:
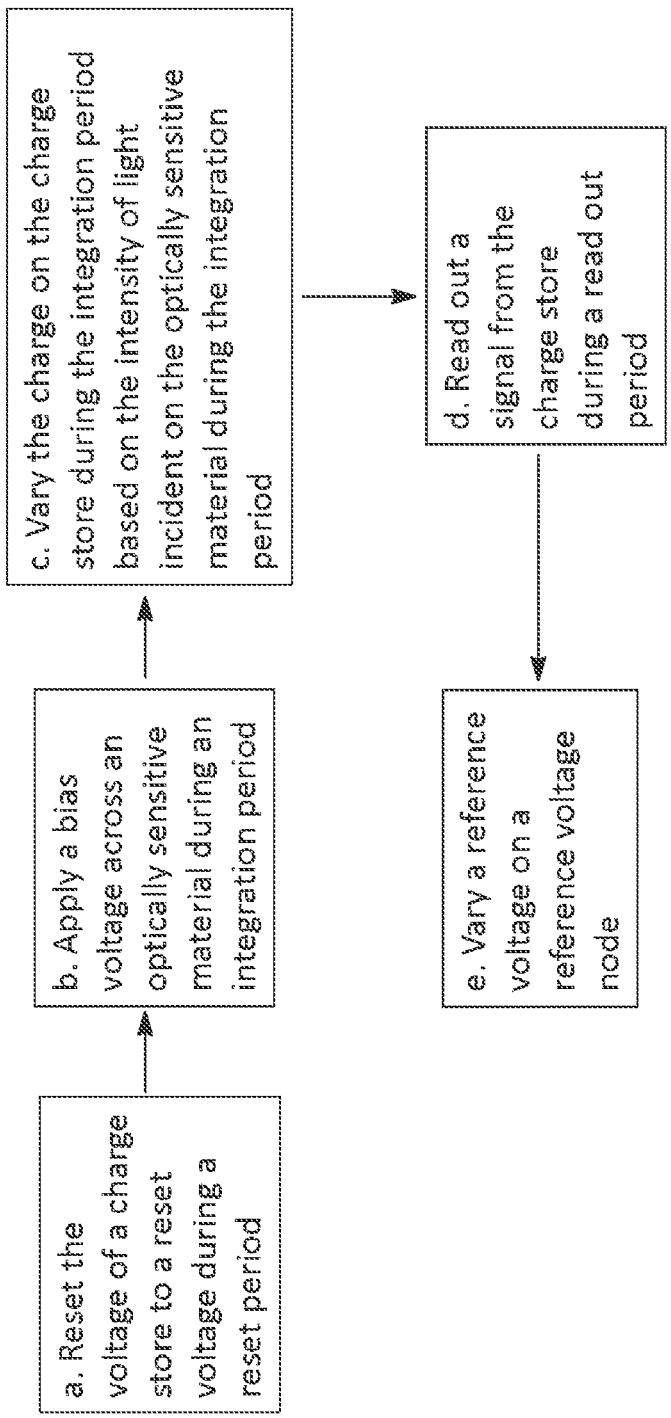
FIG. 13 is a flowchart depicting a method for detecting an image comprising: resetting the voltage of a charge store to a reset voltage during a reset period; applying a bias voltage across an optically sensitive material during an integration period; varying the charge on the charge store during the integration period based on the intensity of light incident on the optically sensitive material during the integration period; reading out a signal from the charge store during a read out period; varying a reference voltage on a reference voltage node; wherein the reference voltage on the reference voltage node is used to reset the voltage of the charge store during the reset period; and wherein the reference voltage on the reference voltage node is used for read out of the signal from the charge store during the read out period.
Figure 14:
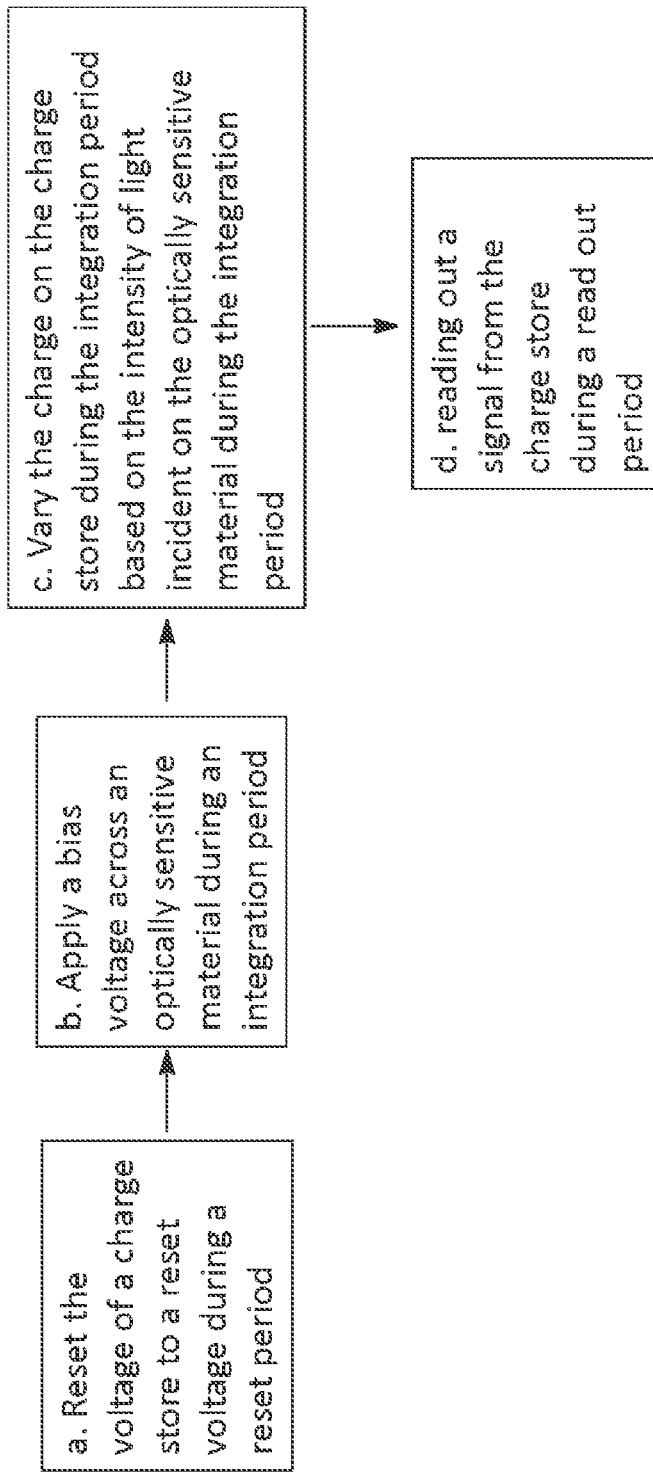
FIG. 14 is a flowchart depicting a method for detecting an image comprising: resetting the voltage of a charge store to a reset voltage during a reset period; applying a bias voltage across an optically sensitive material during an integration period; varying the charge on the charge store during the integration period based on the intensity of light incident on the optically sensitive material during the integration period; and reading out a signal from the charge store during a read out period; wherein the bias voltage during the integration period is greater than the reset voltage.
Figure 15:
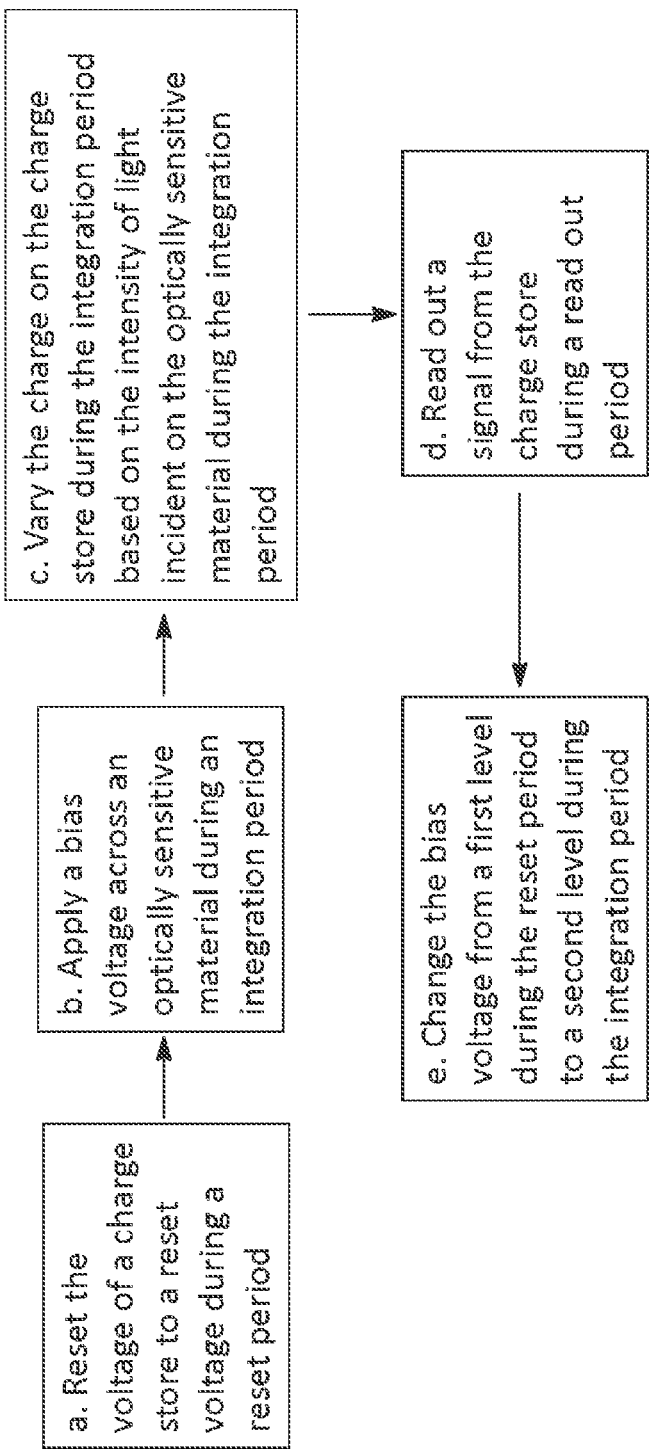
FIG. 15 is a flowchart depicting a method for detecting an image comprising: resetting the voltage of a charge store to a reset voltage during a reset period; applying a bias voltage across an optically sensitive material during an integration period; varying the charge on the charge store during the integration period based on the intensity of light incident on the optically sensitive material during the integration period; reading out a signal from the charge store during a read out period; and changing the bias voltage from a first level during the reset period to a second level during the integration period.
Figure 16:
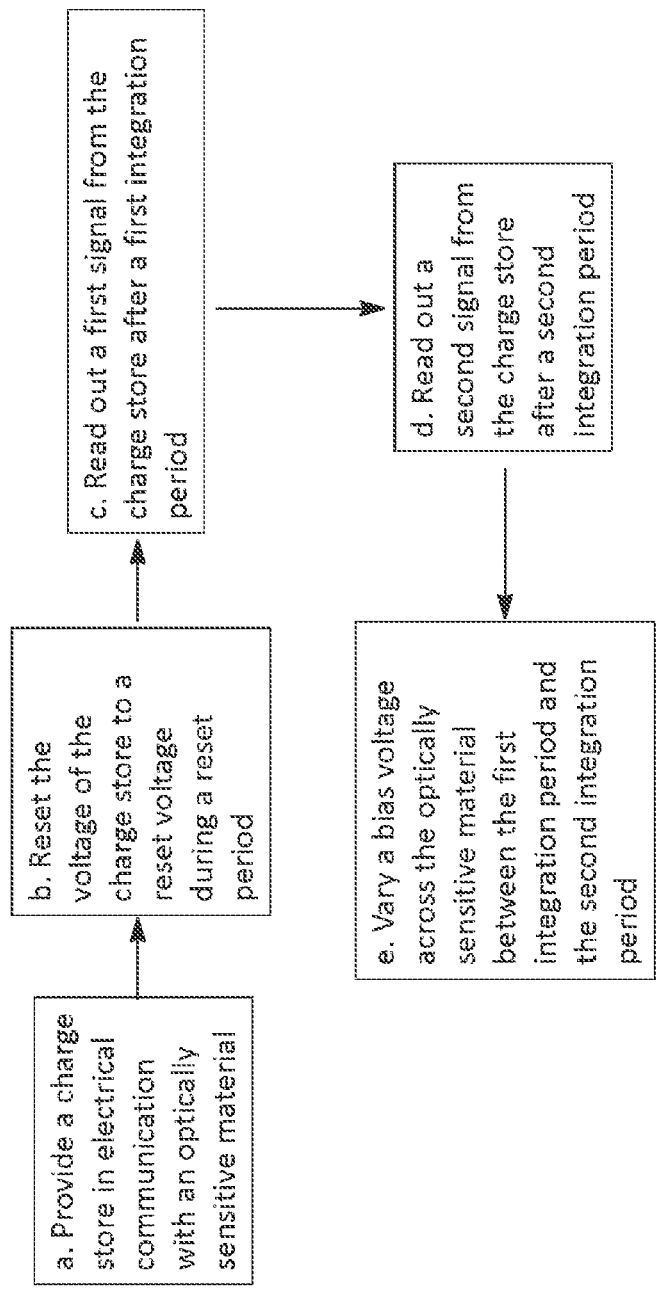
FIG. 16 is a flowchart depicting a method for detecting an image comprising: providing a charge store in electrical communication with an optically sensitive material; resetting the voltage of the charge store to a reset voltage during a reset period; reading out a first signal from the charge store after a first integration period; reading out a second signal from the charge store after a second integration period; varying a bias voltage across the optically sensitive material between the first integration period and the second integration period.

FIG. 12 is a timing diagram of one of the specific embodiment for each of the two frames described in FIG. 10, using the circuit described in FIG. 11. In this example shown in FIG. 12, the solid lines are used to describe the detailed timing of '0-bias frame'. In 'normal light frame', vfilm (the bias electrode), diode and vcol (the read out line) behave differently from '0-bias frame.' Dashed lines are added to these three signals to describe how they behave in 'normal light frame.'

During a first period labeled "True reset," the diode is reset to a known reference point, by setting the reset electrode to high voltage (turning on the reset transistor M1). VLEVEL is kept constant at high level such as 3V in this example.

During a second period labeled "Integration," the electrode vfilm (the biasing electrode) is set to a constant voltage. For '0-bias frame' this voltage is high, equal to voltage on diode node. For 'normal light frame' this voltage is set lower, for example, to be −2V. In '0-bias frame' there is no accumulation of photocurrent. Diode voltage drops slowly due to silicon diode leakage. In 'normal light frame,' in addition to the same silicon diode leakage, light induced photocurrent is also accumulated to pull diode lower in a faster rate.

During a third period labeled "Read signal," the select is turned on. The signal on diode node is read out through the vcol or read out line.

During a fourth period labeled "CDS reset," the reset electrode goes high again, setting the diode voltage to the same known level.

During a fifth period labeled "Read reset," the reference diode level is read out through the vcol or read out line.

The difference between the 'read reset' and 'read signal' is representing the light intensity. The subtraction can be accomplished in either analog domain (analog CDS) or digital domain (digital CDS). The result of the subtraction is referred to 'post-CDS signal.'

In another embodiment, the CDS operation can be skipped. The timing stops at 'read signal' phase for each frame.

Figure 5:
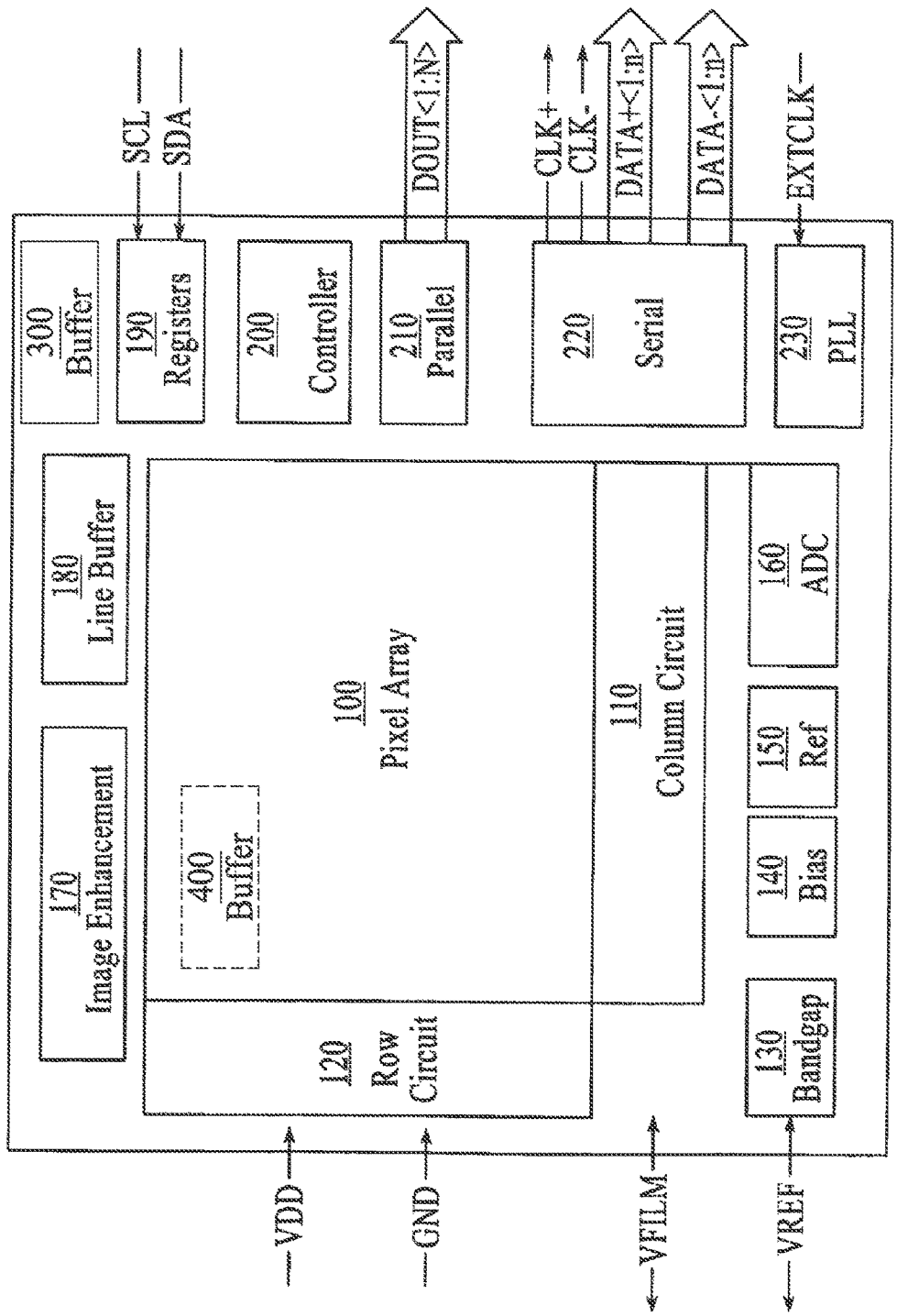
FIG. 5 is a block diagram of an example system configuration that may be used in combination with embodiments described herein.

FIG. 5 is a specific embodiment of the system level implementation for the "zero-bias frame subtraction". Block 300 is used to store the 'post-CDS signal' or the 'read signal' of the '0-bias frame'. This signal is then subtracted out of the 'post-CDS signal' or the 'read signal' of the 'normal light frame'. One can also store these signals in analog memory, for example inside pixel, and perform the subtraction in analog domain. A dashed block 400 is supposed on top of pixel array to show the example of in-pixel analog storage for the '0-bias frame.'

The time spent in '0-bias frame' can be equal or less or longer than the 'normal light frame.' For example when the time spent in both sections are equal, the signal readout from the '0-bias frame' is directly subtracted out from 'normal light frame,' to remove the dark current of silicon diode during integration. When '0-bias frame' time is shorter or longer than 'normal light frame,' the two readout signals should be scaled accordingly. For example when '0-bias frame' integration time is only ¼ of the 'normal light frame,' the '0-bias frame' signal should be adjusted up by 4×, before the subtraction happens. Alternatively the 'normal light frame' signal can be adjusted by ¼× before the subtraction happens. It is desirable to use 'post-CDS signal,' not the 'read signal,' for non-equal integration time cases.

Example embodiments provide image sensors that use an array of pixel elements to detect an image. The pixel elements may include photosensitive material. The image sensor may detect a signal from the photosensitive material in each of the pixel regions that varies based on the intensity of light incident on the photosensitive material. In one example embodiment, the photosensitive material is a continuous film of interconnected nanoparticles. Electrodes are used to apply a bias across each pixel area. Pixel circuitry is used to integrate a signal in a charge store over a period of time for each pixel region. The circuit stores an electrical signal proportional to the intensity of light incident on the optically sensitive layer during the integration period. The electrical signal can then be read from the pixel circuitry and processed to construct a digital image corresponding to the light incident on the array of pixel elements. In example embodiments, the pixel circuitry may be formed on an integrated circuit device below the photosensitive material. For example, a nanocrystal photosensitive material may be layered over a CMOS integrated circuit device to form an image sensor. Metal contact layers from the CMOS integrated circuit may be electrically connected to the electrodes that provide a bias across the pixel regions. U.S. patent application Ser. No. 12/106,256, entitled "Materials, Systems and Methods for Optoelectronic Devices," filed Apr. 18, 2008 (U.S. Published Patent Application No. 2009/0152664) includes additional descriptions of optoelectronic devices, systems and materials that may be used in connection with example embodiments and is hereby incorporated herein by reference in its entirety. This is an example embodiment only and other embodiments may use different photodetectors and photosensitive materials. For example, embodiments may use silicon or Gallium Arsenide (GaAs) photodetectors.

In example embodiments, an image sensor may be provided with a large number of pixel elements to provide high resolution. For example, an array of 4, 6, 8, 12 or more megapixels may be provided.

Achieving excellent sensitivity to low light entails maximizing the signal, and minimizing the noise, in each pixel making up an image sensor. It is also of high importance to minimize the leakage of light, and of photocurrent, between adjacent pixels, a phenomenon that appears as crosstalk, or as color crosstalk in color images.

Existing approaches to sensing based on silicon suffer limitations in their quantum efficiency, thereby limiting the signal available for a given level of illumination of a given pixel. These limitations become particularly acute as large numbers of pixel elements are employed, especially when this is combined with the desirability of producing image sensor integrated circuits having small areas such as diagonal dimensions of order ⅓" or ¼", entails the use of small individual pixels. Desirable pixel geometries include, for example, 1.75 um linear side dimensions, 1.4 um linear side dimensions, 1.1 um linear side dimensions, 0.9 um linear side dimensions, 0.8 um linear side dimensions, and 0.7 um linear side dimensions.

In front-side illuminated image sensors, the incident light to be detected must be transmitted through an optical aperture in the layers of routing metal within the interlayer dielectric that reside above the plane of the silicon. This limits chief ray acceptance angle, necessitates the use of microlenses, and reduces fill factor, the latter resulting in a loss of sensitivity. Additionally, the need for transistors for pixel read-out in the silicon associated with each pixel reduces fill factor, also curtailing sensitivity.

Back-side illuminated image sensors address some of the preceding limitations by exposing the silicon substrate side to incident light. The back-side illumination allows light to occur in principle over the entire area of each pixel, addressing in principle the fill factor problem. The elevation of the sensing function above the metal and interlayer dielectric levels allows in principle a high chief ray angle, though this is curtailed by silicon's high refractive index which leads to the onset of significant reflection at even moderate off-normal incidence angles, and raises challenges in the realization of angularly- and spectrally-broadband antireflection. The back-side illuminated concept, while it addresses some of the challenges in small-pixel image sensors, does not address one of their fundamental limitations: silicon has relatively weak absorption in the red (~630 nm), corresponding to an absorption length greater than 1 um, which in turn necessitates the use of well over 1 um worth of silicon light-absorbing material to achieve substantially complete absorption. In pixels with the small (sub-2-um) lateral dimensions outlined above, this leads to significant optical crosstalk among adjacent pixels. When a color filter array is employed to achieve color imaging, this translates into optical crosstalk.

The fundamental limitation of silicon's long absorption length in some wavelengths of the visible spectrum can be addressed through the use of a much more rapidly light-absorbing material. The problems associated with fill factor in certain CMOS image sensors can be overcome if such a rapidly-absorbing material may be integrated on the top surface of the silicon wafer. This same top-surface architecture also helps overcome the limited chief ray acceptance angle of conventional architectures.

The top-surface detector material should achieve a shorter absorption length than silicon's across the spectra range of interest. Absorption lengths of 1 um and below are desired. Materials processing and integration that can be achieved at low additional cost to manufacture, and can be achieved within a conventional CMOS silicon fabrication foundry.

Examples of materials that can potentially achieve the above objectives simultaneously include, for example:

(1) Dense thin films made of colloidal quantum dots. Constituent materials include PbS, PbSe, PbTe; CdS, CdSe, CdTe; Bi2S3, In2S3, In2Se3; SnS, SnSe, SnTe; ZnS, ZnSe, ZnTe. The nanoparticles may be in the range 1-10 nm in diameter, and may be substantially monodispersed, i.e., may possess substantially the same size and shape. The materials may include organic ligands and/or crosslinkers to aid in surface passivation and of a length and conductivity that, combined, facilitate inter-quantum-dot charge transfer.

(2) Thin films made of organic materials that are strongly absorptive of light in some or all wavelength ranges of interest. Constituent materials include P3HT, PCBM, PPV, MEH-PPV, and copper phthalocyanine and related metal phthalocyanines.

(3) Thin films made of inorganic materials such as CdTe, copper indium gallium (di)selenide (CIGS), and Cu2ZnSnS4 (CZTS).

Embodiments include a means of reducing the time-averaged leakage current, and therefore the time-averaged dark current, using dynamic biasing of the read-out circuit. As a consequence, it enables the achievement of improved signal-to-noise ratios in image sensors.

A feature of the photodetectors used in the inventive subject matter discussed herein is the fact that the two biasing electrodes may be controlled independently. Put another way—neither of the electrodes providing a bias across the light-sensing medium is tied to some voltage associated with the silicon, such as a substrate or body voltage. Instead, each of the electrodes, and the photodetection device itself, may be described as 'floating' relative to arbitrary fixed potentials elsewhere in the circuit.

In an example embodiment, each pixel includes a photodetecting material; two biasing electrodes that are independently electrically controllable; and three transistors for reading the electrical signal collected from the photodetector. One of the two electrodes in electrical communication with the photodetecting material—this electrode to be referred to as the pixel electrode—is connected to a transistor source for signal readout. The other electrode in electrical communication with the photodetecting material—referred to as the common electrode—goes to a voltage source.

3 different ways of controlling the floating photodetector to reduce silicon diode dark current are shown below.

The $1^{st}$ Embodiment:

During the reset phase, the common electrode is set to a medium voltage, for example 3V (normal range from −5V to 5V). The pixel electrode is driven to be a low voltage, for example 0V (normal range from 0V to 5V).

During the integration phase, the common electrode remains at the same voltage, for example 3V. Light induced photocurrent in the floating photodetector will drive the diode node voltage higher. The photocurrent serves as a current source in this configuration. The use of a low voltage on the pixel electrode significantly suppresses the dark current of the pixel circuitry under a dark condition.

During the read-out phase, the common electrode is brought to a higher level, such as 5V (normal range −5V to 5V). This will boost up the pixel voltage to make sure the low voltage at diode node can be read out through the readout circuit, and thus maintain dynamic range for the readout path. Alternatively, a low VT readout transistor (for example, threshold of 0V, with range of −1V to 1V) can be used to read out the low voltage, in which case the pulsing on common electrode is not necessary.

In one specific testing, the dark current is found to be about 50% lower using this dynamic biasing scheme.

The $2^{nd}$ Embodiment:

During the reset phase, the common electrode is set to a high voltage, for example 5V (normal range of −2V to 10V). The pixel electrode is driven to be at medium voltage, for example 3V (normal range of 0V to 5V).

Before integration starts, the common electrode voltage is pulled low, to for example −1V (normal range −5V to 5V). This will bring down the pixel electrode, to for example 1V (normal range of 0V to 5V).

During the integration phase, the common electrode remains at the same voltage of −1V. Light induced photocurrent in the floating photodetector will drive the diode node voltage lower. The photocurrent serves as a current sink in this configuration. The use of a low voltage on the pixel electrode significantly suppresses the dark current of the pixel circuitry.

During the read-out phase, the common electrode is brought back to a higher level, such as 5V (normal range of −2V to 10V). This will boost up the pixel voltage to make sure the low voltage at diode node can be read out through the readout circuit, and thus maintain dynamic range for the readout path. Alternatively a low VT readout transistor can be used to read out the low voltage, in which case the pulsing on common electrode is not necessary.

The $3^{rd}$ Embodiment:

This 'zero-bias frame subtraction' scheme involves a two-frame readout. During the integration time of the first frame, the floating photodetector is biased at near 0V (i.e., the pixel electrode and the common electrode have the same bias voltage). This bias voltage can also be slight higher or lower than 0V, as far as the detector is not sensitive to light under such bias (normal range of −1V to 1V). As the result the photodetector will not generate any photocurrent, and the readout signal is mainly from the silicon diode dark current. For the $2^{nd}$ frame integration, the floating photodetector is biased to operate in normal condition, providing photocurrent to the diode node (as a current sink or current source). So the $2^{nd}$ frame signal includes both light signal and the silicon dark current. By subtracting the signal of $1^{st}$ frame from the $2^{nd}$ frame, the light signal is obtained while silicon dark current is largely cancelled by the subtraction. This 'zero-bias frame subtraction' can be performed on the fly during image capture, without needing a mechanical shutter.

The pictures show that the dark current can be significantly suppressed by this 'zero-bias frame subtraction' scheme, which results in improved sensitivity.

An extension of this embodiment allows one to use the 'zero-bias' floating diode as a potential global shutter, replacing the mechanical shutter.

Image sensors incorporate arrays of photodetectors. These photodetectors sense light, converting it from an optical to an electronic signal. FIG. 1 shows structure of and areas relating to quantum dot pixel chip structures (QDPCs) 100, according to example embodiments. As illustrated in FIG. 1, the QDPC 100 may be adapted as a radiation 1000 receiver where quantum dot structures 1100 are presented to receive the radiation 1000, such as light. The QDPC 100 includes quantum dot pixels 1800 and a chip 2000 where the chip is adapted to process electrical signals received from the quantum dot pixel 1800. The quantum dot pixel 1800 includes the quantum dot structures 1100 include several components and sub components such as quantum dots 1200, quantum dot materials 200 and particular configurations or quantum dot layouts 300 related to the dots 1200 and materials 200. The quantum dot structures 1100 may be used to create photodetector structures 1400 where the quantum dot structures are associated with electrical interconnections 1404. The electrical connections 1404 are provided to receive electric signals from the quantum dot structures and communicate the electric signals on to pixel circuitry 1700 associated with pixel structures 1500. Just as the quantum dot structures 1100 may be laid out in various patterns, both planar and vertical, the photodetector structures 1400 may have particular photodetector geometric layouts 1402. The photodetector structures 1400 may be associated with pixel structures 1500 where the electrical interconnections 1404 of the photodetector structures are electrically associated with pixel circuitry 1700. The pixel structures 1500 may also be laid out in pixel layouts 1600 including vertical and planar layouts on a chip 2000 and the pixel circuitry 1700 may be associated with other components 1900, including memory for example. The pixel circuitry 1700 may include passive and active components for processing of signals at the pixel 1800 level. The pixel 1800 is associated both mechanically and electrically with the chip 2000. From an electrical viewpoint, the pixel circuitry 1700 may be in communication with other electronics (e.g. chip processor 2008). The other electronics may be adapted to process digital signals, analog signals, mixed signals and the like and it may be adapted to process and manipulate the signals received from the pixel circuitry 1700. In other embodiments, a chip processor 2008 or other electronics may be included on the same semiconductor substrate as the QDPCs and may be structured using a system-on-chip architecture. The chip 2000 also includes physical structures 2002 and other functional components 2004, which will also be described in more detail below.

The QDPC 100 detects electromagnetic radiation 1000, which in embodiments may be any frequency of radiation from the electromagnetic spectrum. Although the electromagnetic spectrum is continuous, it is common to refer to ranges of frequencies as bands within the entire electromagnetic spectrum, such as the radio band, microwave band, infrared band (IR), visible band (VIS), ultraviolet band (UV), X-rays, gamma rays, and the like. The QDPC 100 may be capable of sensing any frequency within the entire electromagnetic spectrum; however, embodiments herein may reference certain bands or combinations of bands within the electromagnetic spectrum. It should be understood that the use of these bands in discussion is not meant to limit the range of frequencies that the QDPC 100 may sense, and are only used as examples. Additionally, some bands have common usage sub-bands, such as near infrared (NIR) and far infrared (FIR), and the use of the broader band term, such as IR, is not meant to limit the QDPCs 100 sensitivity to any band or sub-band. Additionally, in the following description, terms such as "electromagnetic radiation," "radiation," "electromagnetic spectrum," "spectrum," "radiation spectrum," and the like are used interchangeably, and the term color is used to depict a select band of radiation 1000 that could be within any portion of the radiation 1000 spectrum, and is not meant to be limited to any specific range of radiation 1000 such as in visible 'color.'

In the example embodiment of FIG. 1, the nanocrystal materials and photodetector structures described above may be used to provide quantum dot pixels 1800 for a photosensor array, image sensor or other optoelectronic device. In example embodiments, the pixels 1800 include quantum dot structures 1100 capable of receiving radiation 1000, photodetectors structures adapted to receive energy from the quantum dot structures 1100 and pixel structures. The quantum dot pixels described herein can be used to provide the following in some embodiments: high fill factor, potential to bin, potential to stack, potential to go to small pixel sizes, high performance from larger pixel sizes, simplify color filter array, elimination of de-mosaicing, self-gain setting/automatic gain control, high dynamic range, global shutter capability, auto-exposure, local contrast, speed of readout, low noise readout at pixel level, ability to use larger process geometries (lower cost), ability to use generic fabrication processes, use digital fabrication processes to build analog circuits, adding other functions below the pixel such as memory, A to D, true correlated double sampling, binning, etc. Example embodiments may provide some or all of these features. However, some embodiments may not use these features.

A quantum dot 1200 may be a nanostructure, typically a semiconductor nanostructure, that confines a conduction band electrons, valence band holes, or excitons (bound pairs of conduction band electrons and valence band holes) in all three spatial directions. A quantum dot exhibits in its absorption spectrum the effects of the discrete quantized energy spectrum of an idealized zero-dimensional system. The wave functions that correspond to this discrete energy spectrum are typically substantially spatially localized within the quantum dot, but extend over many periods of the crystal lattice of the material.

Figure 2:
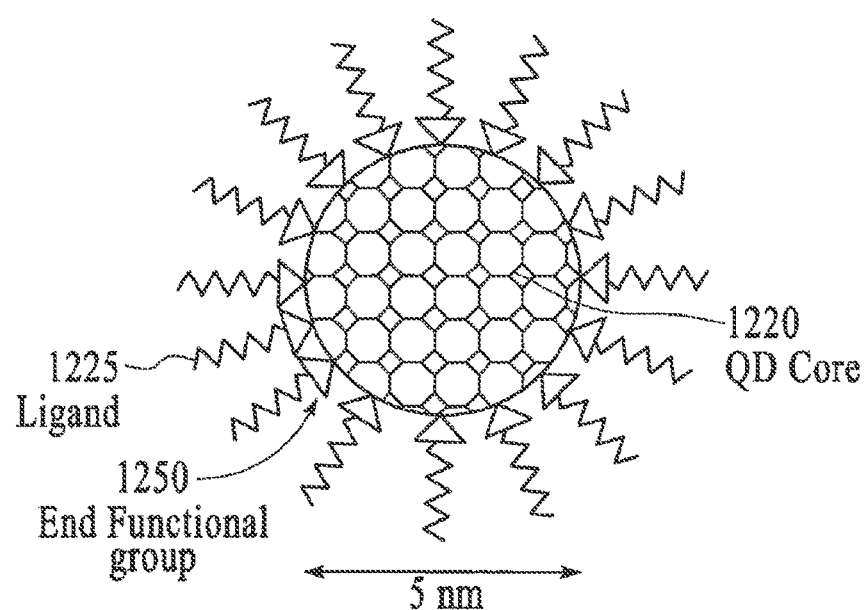
FIG. 2 shows an example of a quantum dot 1200.

FIG. 2 shows an example of a quantum dot 1200. In one example embodiment, the QD 1200 has a core 1220 of a semiconductor or compound semiconductor material, such as PbS. Ligands 1225 may be attached to some or all of the outer surface or may be removed in some embodiments as described further below. In some embodiments, the cores 1220 of adjacent QDs may be fused together to form a continuous film of nanocrystal material with nanoscale features. In other embodiments, cores may be connected to one another by linker molecules.

Some embodiments of the QD optical devices are single image sensor chips that have a plurality of pixels, each of which includes a QD layer that is radiation 1000 sensitive, e.g., optically active, and at least two electrodes in electrical communication with the QD layer. The current and/or voltage between the electrodes is related to the amount of radiation 1000 received by the QD layer. Specifically, photons absorbed by the QD layer generate electron-hole pairs, such that, if an electrical bias is applied, a current flows. By determining the current and/or voltage for each pixel, the image across the chip can be reconstructed. The image sensor chips have a high sensitivity, which can be beneficial in low-radiation-detecting 1000 applications; a wide dynamic range allowing for excellent image detail; and a small pixel size. The responsivity of the sensor chips to different optical wavelengths is also tunable by changing the size of the QDs in the device, by taking advantage of the quantum size effects in QDs. The pixels can be made as small as 1 square micron or less, or as large as 30 by 30 microns or more or any range subsumed therein.

The photodetector structure 1400 is a device configured so that it can be used to detect radiation 1000 in example embodiments. The detector may be 'tuned' to detect prescribed wavelengths of radiation 1000 through the types of quantum dot structures 1100 that are used in the photodetector structure 1400. The photodetector structure can be described as a quantum dot structure 1100 with an I/O for some input/output ability imposed to access the quantum dot structures' 1100 state. Once the state can be read, the state can be communicated to pixel circuitry 1700 through an electrical interconnection 1404, wherein the pixel circuitry may include electronics (e.g., passive and/or active) to read the state. In an embodiment, the photodetector structure 1400 may be a quantum dot structure 1100 (e.g., film) plus electrical contact pads so the pads can be associated with electronics to read the state of the associated quantum dot structure.

In embodiments, processing my include binning of pixels in order to reduce random noise associated with inherent properties of the quantum dot structure 1100 or with readout processes. Binning may involve the combining of pixels 1800, such as creating 2×2, 3×3, 5×5, or the like superpixels.

There may be a reduction of noise associated with combining pixels 1800, or binning, because the random noise increases by the square root as area increases linearly, thus decreasing the noise or increasing the effective sensitivity. With the QDPC's 100 potential for very small pixels, binning may be utilized without the need to sacrifice spatial resolution, that is, the pixels may be so small to begin with that combining pixels doesn't decrease the required spatial resolution of the system. Binning may also be effective in increasing the speed with which the detector can be run, thus improving some feature of the system, such as focus or exposure.

In embodiments the chip may have functional components that enable high-speed readout capabilities, which may facilitate the readout of large arrays, such as 5 Mpixels, 6 Mpixels, 8 Mpixels, 12 Mpixels, or the like. Faster readout capabilities may require more complex, larger transistor-count circuitry under the pixel 1800 array, increased number of layers, increased number of electrical interconnects, wider interconnection traces, and the like.

In embodiments, it may be desirable to scale down the image sensor size in order to lower total chip cost, which may be proportional to chip area. However, shrinking chip size may mean, for a given number of pixels, smaller pixels. In existing approaches, since radiation 1000 must propagate through the interconnect layer onto the monolithically integrated silicon photodiode lying beneath, there is a fill-factor compromise, whereby part of the underlying silicon area is obscured by interconnect; and, similarly, part of the silicon area is consumed by transistors used in read-out. One workaround is micro-lenses, which add cost and lead to a dependence in photodiode illumination on position within the chip (center vs. edges); another workaround is to go to smaller process geometries, which is costly and particularly challenging within the image sensor process with its custom implants.

In embodiments, the technology discussed herein may provide a way around these compromises. Pixel size, and thus chip size, may be scaled down without decreasing fill factor. Larger process geometries may be used because transistor size, and interconnect line-width, may not obscure pixels since the photodetectors are on the top surface, residing above the interconnect. In the technology proposed herein, large geometries such as 0.13 um and 0.18 um may be employed without obscuring pixels. Similarly, small geometries such as 90 nm and below may also be employed, and these may be standard, rather than image-sensor-customized, processes, leading to lower cost. The use of small geometries may be more compatible with high-speed digital signal processing on the same chip. This may lead to faster, cheaper, and/or higher-quality image sensor processing on chip. Also, the use of more advanced geometries for digital signal processing may contribute to lower power consumption for a given degree of image sensor processing functionality.

An example integrated circuit system that can be used in combination with the above photodetectors, pixel regions and pixel circuits will now be described in connection with FIG. 5. FIG. 5 is a block diagram of an image sensor integrated circuit (also referred to as an image sensor chip). The chip includes:
    a pixel array (100) in which incident light is converted into electronic signals, and in which electronic signals are integrated into charge stores whose contents and voltage levels are related to the integrated light incident over the frame period;

row and column circuits (110 & 120) which are used to reset each pixel, and read the signal related to the contents of each charge store, in order to convey the information related to the integrated light over each pixel over the frame period to the outer periphery of the chip analog circuits (130, 140, 150, 160, 230). The pixel electrical signal from the column circuits is fed into the analog-to-digital converter (160) where it is converted into a digital number representing the light level at each pixel. The pixel array and ADC are supported by analog circuits that provide bias and reference levels (130, 140, & 150).

digital circuits (170, 180, 190, 200). The Image Enhancement circuitry (170) provides image enhancement functions to the data output from ADC to improve the signal to noise ratio. Line buffer (180) temporarily stores several lines of the pixel values to facilitate digital image processing and IO functionality. (190) is a bank of registers that prescribe the global operation of the system and/or the frame format. Block 200 controls the operation of the chip.

IO circuits (210 & 220) support both parallel input/output and serial input/output. (210) is a parallel IO interface that outputs every bit of a pixel value simultaneously. (220) is a serial IO interface where every bit of a pixel value is output sequentially.

a phase-locked loop (230) provides a clock to the whole chip.

In a particular example embodiment, when 0.11 um CMOS technology node is employed, the periodic repeat distance of pixels along the row-axis and along the column-axis may be 900 nm, 1.1 um, 1.2 um, 1.4 um, 1.75 um, 2.2 um, or larger. The implementation of the smallest of these pixels sizes, especially 900 nm, 1.1 um, and 1.2 um, may require transistor sharing among pairs or larger group of adjacent pixels.

Very small pixels can be implemented in part because all of the silicon circuit area associated with each pixel can be used for read-out electronics since the optical sensing function is achieved separately, in another vertical level, by the optically-sensitive layer that resides above the interconnect layer.

Because the optically sensitive layer and the read-out circuit that reads a particular region of optically sensitive material exist on separate planes in the integrated circuit, the shape (viewed from the top) of (1) the pixel read-out circuit and (2) the optically sensitive region that is read by (1); can be generally different. For example it may be desired to define an optically sensitive region corresponding to a pixel as a square; whereas the corresponding read-out circuit may be most efficiently configured as a rectangle.

In an imaging array based on a top optically sensitive layer connected through vias to the read-out circuit beneath, there exists no imperative for the various layers of metal, vias, and interconnect dielectric to be substantially or even partially optically transparent, although they may be transparent in some embodiments. This contrasts with the case of front-side-illuminated CMOS image sensors in which a substantially transparent optical path must exist traversing the interconnect stack. In the case of conventional CMOS image sensors, this presents an additional constraint in the routing of interconnect. This often reduces the extent to which a transistor, or transistors, can practically be shared. For example, 4:1 sharing is often employed, but higher sharing ratios are not. In contrast, a read-out circuit designed for use with a top-surface optically-sensitive layer can employ 8:1 and 16:1 sharing.

Some embodiments of QD devices include a QD layer and a custom-designed or pre-fabricated electronic read-out integrated circuit. The QD layer is then formed directly onto the custom-designed or pre-fabricated electronic read-out integrated circuit. In some embodiments, wherever the QD layer overlies the circuit, it continuously overlaps and contacts at least some of the features of the circuit. In some embodiments, if the QD layer overlies three-dimensional features of the circuit, the QD layer may conform to these features. In other words, there exists a substantially contiguous interface between the QD layer and the underlying electronic read-out integrated circuit. One or more electrodes in the circuit contact the QD layer and are capable of relaying information about the QD layer, e.g., an electronic signal related to the amount of radiation 1000 on the QD layer, to a readout circuit. The QD layer can be provided in a continuous manner to cover the entire underlying circuit, such as a readout circuit, or patterned. If the QD layer is provided in a continuous manner, the fill factor can approach about 100%, with patterning, the fill factor is reduced, but can still be much greater than a typical 35% for some example CMOS sensors that use silicon photodiodes.

In embodiments, the QD optical devices described herein are readily fabricated using techniques available in a facility normally used to make conventional CMOS devices. For example, a layer of QDs can be solution-coated onto a pre-fabricated electronic read-out circuit using, e.g., spin-coating, which is a standard CMOS process, and optionally further processed with other CMOS-compatible techniques to provide the final QD layer for use in the device. Because the QD layer need not require exotic or difficult techniques to fabricate, but can instead be made using standard CMOS processes, the QD optical devices can be made in high volumes, and with no significant increase in capital cost (other than materials) over current CMOS process steps.

Figure 3A:
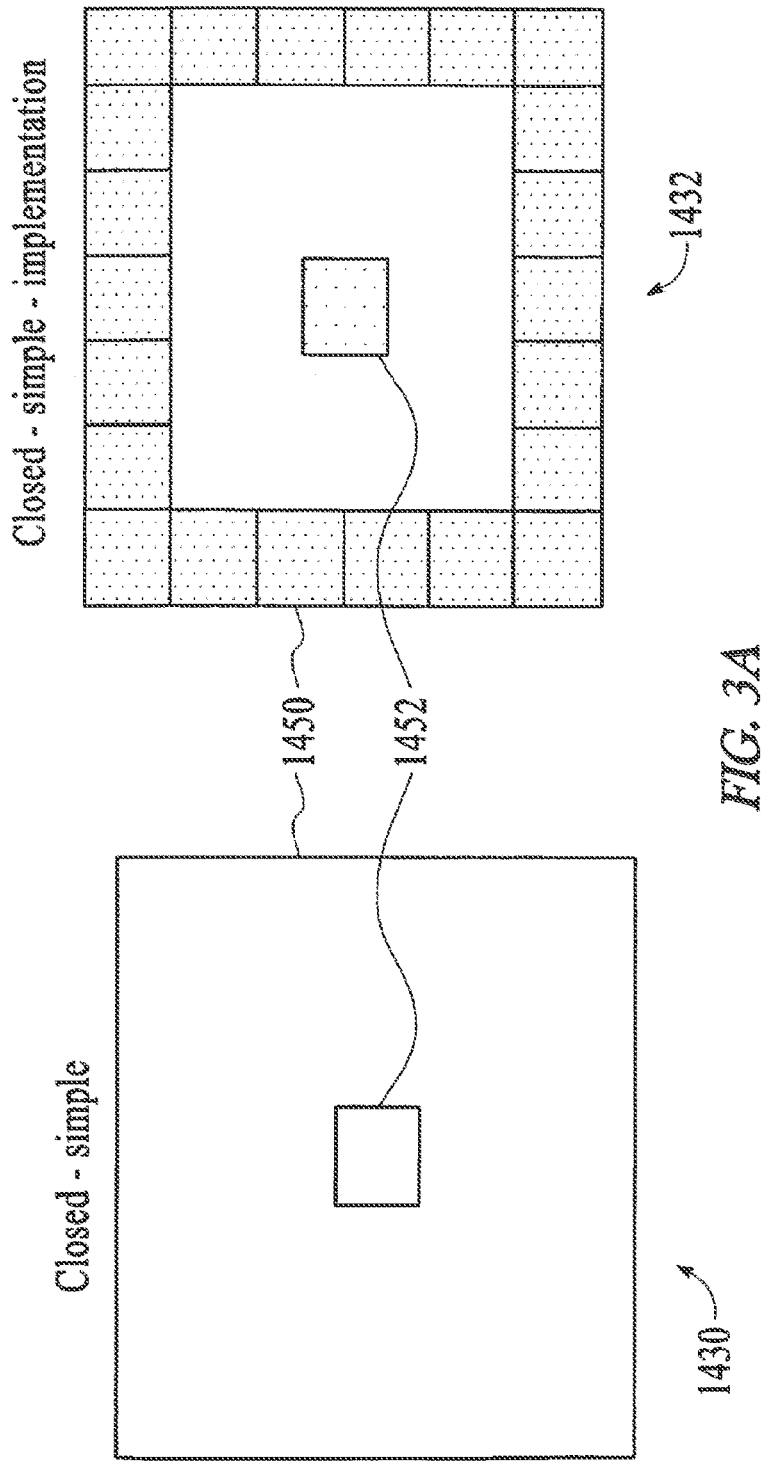
FIG. 3A shows an aspect of a closed simple geometrical arrangement of pixels.
Figure 3C:
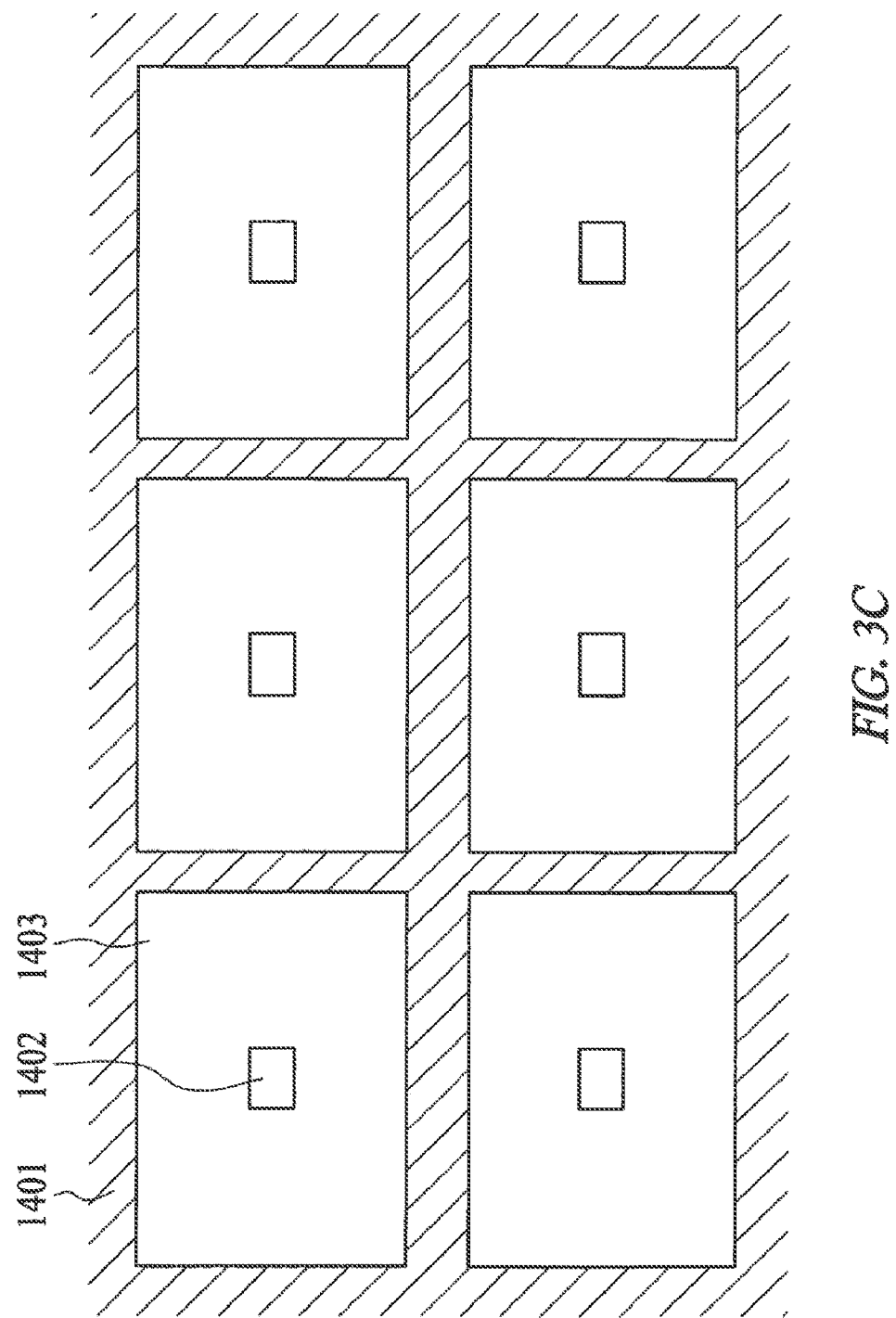
FIG. 3C shows a two-row by three-column sub-region within a generally larger array of top-surface electrodes.

FIG. 3C shows a two-row by three-column sub-region within a generally larger array of top-surface electrodes. The array of electrical contacts provides electrical communication to an overlying layer of optically sensitive material. 1401 represents a common grid of electrodes used to provide one shared contact to the optically sensitive layer. 1402 represents the pixel-electrodes which provide the other contact for electrical communication with the optically sensitive layer. In embodiments, a voltage bias of −2 V may be applied to the common grid 1401, and a voltage of +2.5 V may be applied at the beginning of each integration period to each pixel electrode 1402. Whereas the common contact 1401 is at a single electrical potential across the array at a given time, the pixel electrodes 1402 may vary in time and space across the array. For example if a circuit is configured such that the bias at 1402 varies in relation to current flowing into or out of 1402, then different electrodes 1402 may be at different biases throughout the progress of the integration period. Region 1403 represents the non-contacting region that lies between 1401 and 1402 within the lateral plane. 1403 is generally an insulating material in order to minimize dark current flowing between 1401 and 1402. 1401 and 1402 may generally consist of different materials. Each may for example be chosen for example from the list: TiN; TiN/Al/TiN; Cu; TaN; Ni; Pt; and from the preceding list there may reside superimposed on one or both contacts a further layer or set of layers chosen from: Pt, alkanethiols, Pd, Ru, Au, ITO, or other conductive or partially conductive materials.

In example embodiments using the above structures, interconnect 1452 may form an electrode in electrical communication with a capacitance, impurity region on the semiconductor substrate or other charge store. In some embodiments, a voltage is applied to the charge store and discharges due to the flow of current across the optically sensitive film over an integration period of time. At the end of the integration period of time, the remaining voltage is sampled to generate a signal corresponding to the intensity of light absorbed by the optically sensitive layer during the integration period. In other embodiments, the pixel region may be biased to cause a voltage to accumulate in a charge store over an integration period of time. At the end of the integration period of time, the voltage may be sampled to generate a signal corresponding to the intensity of light absorbed by the optically sensitive layer during the integration period. In some example embodiments, the bias across the optically sensitive layer may vary over the integration period of time due to the discharge or accumulation of voltage at the charge store. This, in turn, may cause the rate of current flow across the optically sensitive material to also vary over the integration period of time. In addition, the optically sensitive material may be a nanocrystal material with photoconductive gain and the rate of current flow may have a non-linear relationship with the intensity of light absorbed by the optically sensitive layer. As a result, in some embodiments, circuitry may be used to convert the signals from the pixel regions into digital pixel data that has a linear relationship with the intensity of light absorbed by the pixel region over the integration period of time. The non-linear properties of the optically sensitive material can be used to provide a high dynamic range, while circuitry can be used to linearize the signals after they are read in order to provide digital pixel data. Example pixel circuits for read out of signals from pixel regions are described further below.

FIG. 3A represents closed—simple patterns 1430 (e.g., conceptual illustration) and 1432 (e.g., vias used to create photodetector structures). In the closed-simple illustrations 1430-1432 the positively biased electrical interconnect 1452 is provided in the center area of a grounded contained square electrical interconnect 1450. Square electrical interconnect 1450 may be grounded or may be at another reference potential to provide a bias across the optically sensitive material in the pixel region. For example, interconnect 1452 may be biased with a positive voltage and interconnect may be biased with a negative voltage to provide a desired voltage drop across a nanocrystal material in the pixel region between the electrodes. In this configuration, when radiation 1000 to which the layer is responsive falls within the square area a charge is developed and the charge is attracted to and move towards the center positively biased electrical interconnect 1452. If these closed-simple patterns are replicated over an area of the layer, each closed simple pattern forms a portion or a whole pixel where they capture charge associated with incident radiation 1000 that falls on the internal square area. In example embodiments, the electrical interconnect 1450 may be part of a grid that forms a common electrode for an array of pixel regions. Each side of the interconnect 1450 may be shared with the adjacent pixel region to form part of the electrical interconnect around the adjacent pixel. In this embodiment, the voltage on this electrode may be the same for all of the pixel regions (or for sets of adjacent pixel regions) whereas the voltage on the interconnect 1452 varies over an integration period of time based on the light intensity absorbed by the optically sensitive material in the pixel region and can be read out to generate a pixel signal for each pixel region. In example embodiments, interconnect 1450 may form a boundary around the electrical interconnect 1452 for each pixel region.

The common electrode may be formed on the same layer as interconnect 1452 and be positioned laterally around the interconnect 1450. In some embodiments, the grid may be formed above or below the layer of optically sensitive material in the pixel region, but the bias on the electrode may still provide a boundary condition around the pixel region to reduce cross over with adjacent pixel regions.

FIG. 3B illustrates open simple patterns of electrical interconnects. The open simple patterns do not, generally, form a closed pattern. The open simple pattern does not enclose a charge that is produced as the result of incident radiation 1000 with the area between the positively biased electrical interconnect 1452 and the ground 1450; however, charge developed within the area between the two electrical interconnects will be attracted and move to the positively biased electrical interconnect 1452. An array including separated open simple structures may provide a charge isolation system that may be used to identify a position of incident radiation 1000 and therefore corresponding pixel assignment. As above, electrical interconnect 1450 may be grounded or be at some other reference potential. In some embodiments, electrical interconnect 1450 may be electrically connected with the corresponding electrode of other pixels (for example, through underlying layers of interconnect) so the voltage may be applied across the pixel array. In other embodiments, the interconnect 1450 may extend linearly across multiple pixel regions to form a common electrode across a row or column.

Pixel circuitry that may be used to read out signals from the pixel regions will now be described. As described above, in embodiments, pixel structures 1500 within the QDPC 100 of FIG. 1 may have pixel layouts 1600, where pixel layouts 1600 may have a plurality of layout configurations such as vertical, planar, diagonal, or the like. Pixel structures 1500 may also have embedded pixel circuitry 1700. Pixel structures may also be associated with the electrical interconnections 1404 between the photodetector structures 1400 and pixel circuitry 1700.

In embodiments, quantum dot pixels 1800 within the QDPC 100 of FIG. 1 may have pixel circuitry 1700 that may be embedded or specific to an individual quantum dot pixel 1800, a group of quantum dot pixels 1800, all quantum dot pixels 1800 in an array of pixels, or the like. Different quantum dot pixels 1800 within the array of quantum dot pixels 1800 may have different pixel circuitry 1700, or may have no individual pixel circuitry 1700 at all. In embodiments, the pixel circuitry 1700 may provide a plurality of circuitry, such as for biasing, voltage biasing, current biasing, charge transfer, amplifier, reset, sample and hold, address logic, decoder logic, memory, TRAM cells, flash memory cells, gain, analog summing, analog-to-digital conversion, resistance bridges, or the like. In embodiments, the pixel circuitry 1700 may have a plurality of functions, such as for readout, sampling, correlated double sampling, sub-frame sampling, timing, integration, summing, gain control, automatic gain control, off-set adjustment, calibration, offset adjustment, memory storage, frame buffering, dark current subtraction, binning, or the like. In embodiments, the pixel circuitry 1700 may have electrical connections to other circuitry within the QDPC 100, such as wherein other circuitry located in at least one of a second quantum dot pixel 1800, column circuitry, row circuitry, circuitry within the functional components 2004 of the QDPC 100, or other features 2204 within the integrated system 2200 of the QDPC 100, or the like. The design flexibility associated with pixel circuitry 1700 may provide for a wide range of product improvements and technological innovations.

Pixel circuitry 1700 within the quantum dot pixel 1800 may take a plurality of forms, ranging from no circuitry at all, just interconnecting electrodes, to circuitry that provides functions such as biasing, resetting, buffering, sampling, conversion, addressing, memory, and the like. In embodiments, electronics to condition or process the electrical signal may be located and configured in a plurality of ways. For instance, amplification of the signal may be performed at each pixel, group of pixels, at the end of each column or row, after the signal has been transferred off the array, just prior to when the signal is to be transferred off the chip 2000, or the like. In another instance, analog-to-digital conversion may be provided at each pixel, group of pixels, at the end of each column or row, within the chip's 2000 functional components 2004, after the signal has been transferred off the chip 2000, or the like. In addition, processing at any level may be performed in steps, where a portion of the processing is performed in one location and a second portion of the processing is performed in another location. An example may be the performing analog-to-digital conversion in two steps, say with an analog combining at the pixel 1800 and a higher-rate analog-to-digital conversion as a part of the chip's 2000 functional components 2004.

In embodiments, different electronic configurations may require different levels of post-processing, such as to compensate for the fact that every pixel has its own calibration level associated with each pixel's readout circuit. The QDPC 100 may be able to provide the readout circuitry at each pixel with calibration, gain-control, memory functions, and the like. Because of the QDPC's 100 highly integrated structure, circuitry at the quantum dot pixel 1800 and chip 2000 level may be available, which may enable the QDPC 100 to be an entire image sensor system on a chip. In some embodiments, the QDPC 100 may also be comprised of a quantum dot material 200 in combination with other conventional semiconductor technologies, such as CCD and CMOS.

Pixel circuitry may be defined to include components beginning at the electrodes in contact with the quantum dot material 200 and ending when signals or information is transferred from the pixel to other processing facilities, such as the functional components 2004 of the underlying chip 200 or another quantum dot pixel 1800. Beginning at the electrodes on the quantum dot material 200, the signal is translated or read. In embodiments, the quantum dot material 200 may provide a change in current flow in response to radiation 1000. The quantum dot pixel 1800 may require bias circuitry 1700 in order to produce a readable signal. This signal in turn may then be amplified and selected for readout.

In embodiments, the biasing of the photodetector may be time invariant or time varying. Varying space and time may reduce cross-talk, and enable a shrinking the quantum dot pixel 1800 to a smaller dimension, and require connections between quantum dot pixels 1800. Biasing could be implemented by grounding at the corner of a pixel 1800 and dots in the middle. Biasing may occur only when performing a read, enabling either no field on adjacent pixels 1800, forcing the same bias on adjacent pixels 1800, reading odd columns first then the even columns, and the like. Electrodes and/or biasing may also be shared between pixels 1800. Biasing may be implemented as a voltage source or as a current source. Voltage may be applied across a number of pixels, but then sensed individually, or applied as a single large bias across a string of pixels 1800 on a diagonal. The current source may drive a current down a row, then read it off across the column. This may increase the level of current involved, which may decrease read noise levels.

In embodiments, configuration of the field, by using a biasing scheme or configuration of voltage bias, may produce isolation between pixels. Currently may flow in each pixel so that only electron-hole pairs generated in that volume of pixel flow within that pixel. This may allow electrostatically implemented inter-pixel isolation and cross-talk reduction, without physical separation. This could break the linkage between physical isolation and cross-talk reduction.

In embodiments, the pixel circuitry 1700 may include circuitry for pixel readout. Pixel readout may involve circuitry that reads the signal from the quantum dot material 200 and transfers the signal to other components 1900, chip functional components 2004, to the other features 2204 of the integrated system 2200, or to other off-chip components. Pixel readout circuitry may include quantum dot material 200 interface circuitry, such as the 3T and 4T circuits shown in FIGS. 6a and 6b for example. Pixel readout may involve different ways to readout the pixel signal, ways to transform the pixel signal, voltages applied, and the like. Pixel readout may require a number of metal contacts with the quantum dot material 200, such as 2, 3, 4, 20, or the like. These electrical contacts may be custom configured for size, degree of barrier, capacitance, and the like, and may involve other electrical components such a Schottky contact. Pixel readout time may be related to how long the radiation 1000-induced electron-hole pair lasts, such as for milliseconds or microseconds. In embodiments, this time my be associated with quantum dot material 200 process steps, such as changing the persistence, gain, dynamic range, noise efficiency, and the like.

Figure 4G:
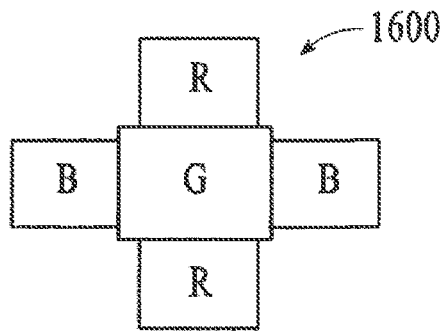
FIG. 4G-4L show pixels of different sizes, layouts and types used in pixel layouts.
Figure 4H:
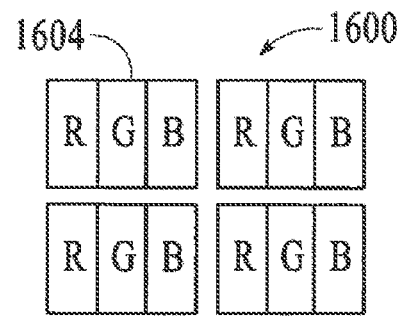
Figure 4I:
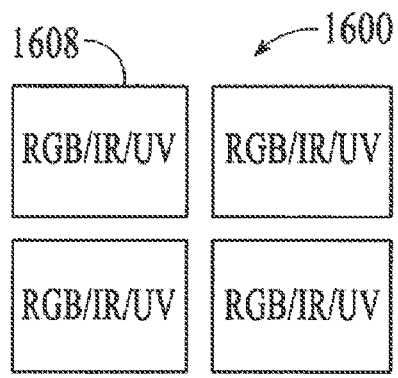
Figure 4J:
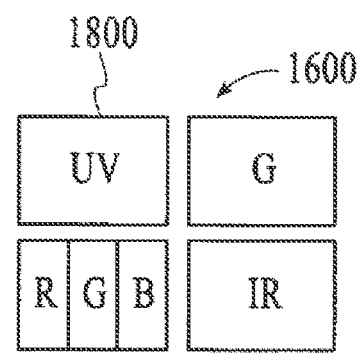
Figure 4K:
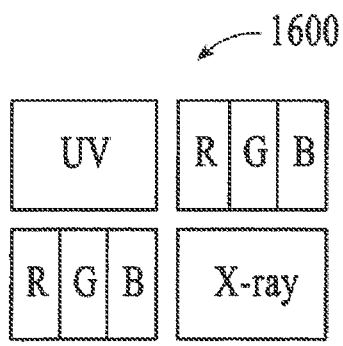
Figure 4L:
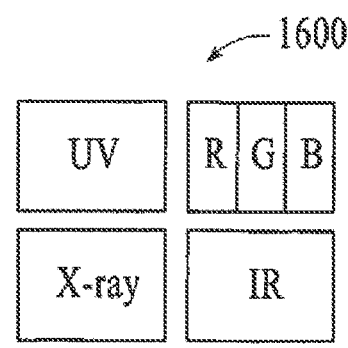
Figure 4M:
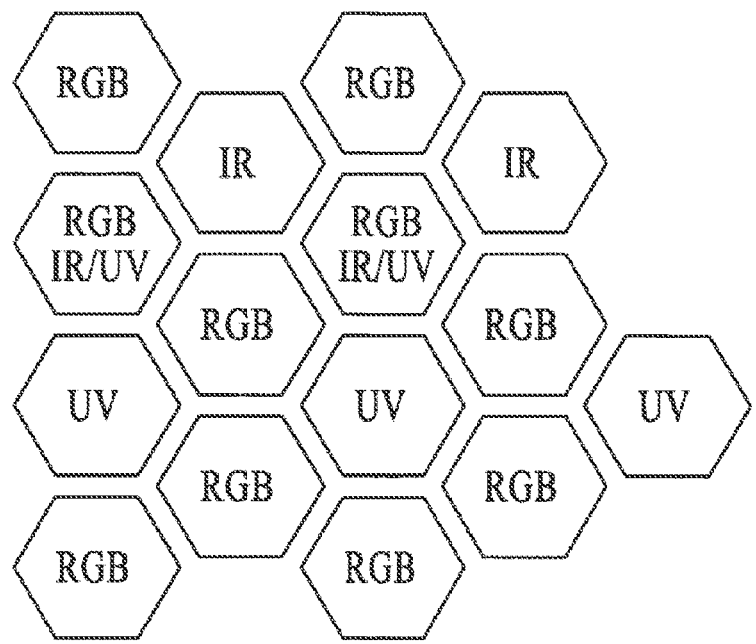
FIG. 4M shows pixel layouts with different shapes, such as hexagons.
Figure 4N:
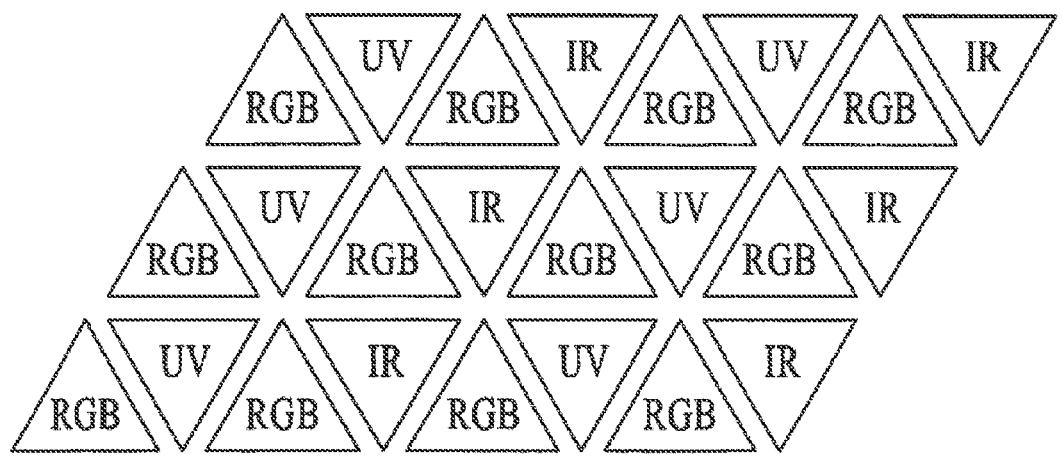
FIG. 4N shows pixel layouts with different shapes, such as triangles.
Figure 4O:
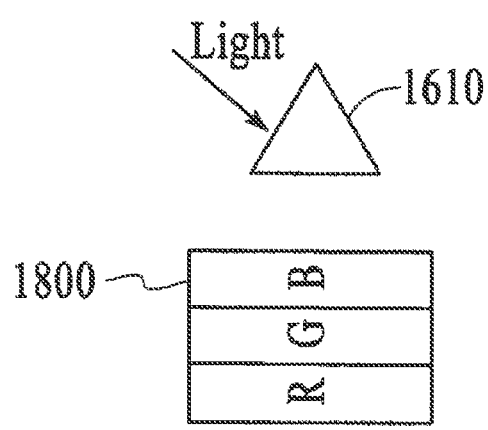
FIG. 4O shows a quantum dot pixel, such as a multi-spectral quantum dot pixel or other pixel, provided in association with an optical element.
Figure 4P:
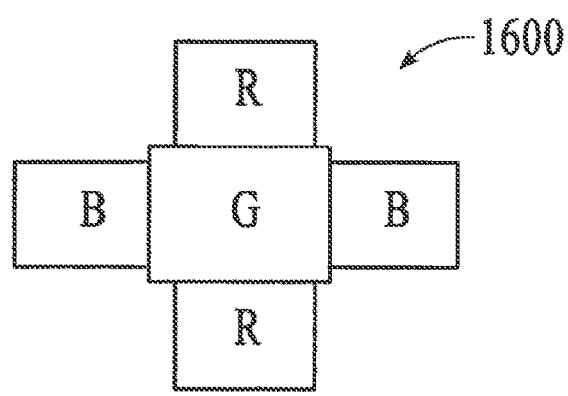
FIG. 4P shows an example of a pixel layout.

The quantum dot pixels 1800 described herein can be arranged in a wide variety of pixel layouts 1600. Referring to FIGS. 4A to 4P, for example, various pixel layouts 1600, such as the Bayer filter layout 1602, includes groupings of pixels disposed in a plane, which different pixels are sensitive to radiation 1000 of different colors. In image sensors, such as those useful in most consumer digital cameras, pixels are rendered sensitive to different colors of radiation 1000 by the use of color filters that are disposed on top of an underlying photodetector, so that the photodetector generates a signal in response to radiation 1000 of a particular range of frequencies, or color. In this configuration, mosaic of different color pixels is referred to often as a color filter array, or color filter mosaic. Although different patterns can be used, the most typical pattern is the Bayer filter pattern 1602 shown in FIG. 4A, where two green pixels, one red pixel and one blue pixel are used, with the green pixels (often referred to as the luminance-sensitive elements) positioned on one diagonal of a square and the red and blue pixels (often referred to as the chrominance-sensitive elements) are positioned on the other diagonal. The use of a second green pixel is used to mimic the human eye's sensitivity to green light. Since the raw output of a sensor array in the Bayer pattern consists of a pattern of signals, each of which corresponds to only one color of light, demosaicing algorithms are used to interpolate red, green and blue values for each point. Different algorithms result in varying quality of the end images. Algorithms may be applied by computing elements on a camera or by separate image processing systems located outside the camera. Quantum dot pixels may be laid out in a traditional color filter system pattern such as the Bayer RGB pattern; however, other patterns may also be used that are better suited to transmitting a greater amount of light, such as Cyan, Magenta, Yellow (CMY). Red, Green, Blue (RGB) color filter systems are generally known to absorb more light than a CMY system. More advanced systems such as RGB Cyan or RGB Clear can also be used in conjunction with Quantum dot pixels.

In one embodiment, the quantum dot pixels 1800 described herein are configured in a mosaic that imitates the Bayer pattern 1602; however, rather than using a color filter, the quantum dot pixels 1800 can be configured to respond to radiation 1000 of a selected color or group of colors, without the use of color filters. Thus, a Bayer pattern 1602 under an embodiment includes a set of green-sensitive, red-sensitive and blue-sensitive quantum dot pixels 1800. Because, in embodiments, no filter is used to filter out different colors of radiation 1000, the amount of radiation 1000 seen by each pixel is much higher.

What is claimed is:

1. An image sensor, comprising:
   a semiconductor substrate;
   a plurality of pixel regions, each pixel region comprising an optically sensitive material over the substrate, the optically sensitive material positioned to receive light;
   a bias electrode for each pixel region, the bias electrode configured to provide a bias voltage to the optically sensitive material of the respective pixel region;
   a pixel circuit for each pixel region, each pixel circuit comprising a charge store formed on the semiconductor substrate and a read out circuit, the charge store being in electrical communication with the optically sensitive material of the respective pixel region,
   the pixel circuit being configured to reset the voltage on the charge store to a reset voltage during a reset period,
   the pixel circuit being further configured to integrate charge from the optically sensitive material to the charge store during an integration period,
   the pixel circuit being further configured to read out a signal from the charge store during a read out period,
   the pixel circuit further including a reference voltage node configured to be coupled to the charge store during the reset period and the read out circuit during the read out period; and
   control circuitry, which is coupled to apply a reference voltage to the reference voltage node and is operative to vary the reference voltage during the operation of the pixel circuit between about zero volts during the reset period and a voltage greater than zero volts during the read out period,
   wherein the control circuitry is operative to set the bias voltage to a first level during the integration period and to a second level during the read out period, the second level being greater than the first level, wherein the first level of the bias voltage is about 3 volts or less.

2. The image sensor of claim 1, wherein the control circuitry is operative to vary the reference voltage between the reset period and the integration period.

3. The image sensor of claim 1, wherein the control circuitry is operative to set the reference voltage to a first level during the reset period and a second level during the integration period.

4. The image sensor of claim 1, wherein the control circuitry is operative to vary the reference voltage during the read out period.

5. The image sensor of claim 1, wherein the pixel circuit is configured to perform correlated double sampling during the read out period.

6. The image sensor of claim 1, wherein the control circuitry is operative to set the reference voltage during the reset period to be within the range of about 1 volt to about −1 volt relative to a substrate potential of the semiconductor substrate.

7. The image sensor of claim 1, wherein the control circuitry is operative to set the reference voltage during the reset period to be substantially the same as a substrate potential of the semiconductor substrate.

8. The image sensor of claim 1, wherein the pixel circuit includes a reset transistor between the reference voltage node and the charge store.

9. The image sensor of claim 8, wherein the reset transistor is open during the reset period and closed during the integration period.

10. The image sensor of claim 8, wherein the reset transistor is closed during a portion of the read out period and open during a portion of the read out period.

11. The image sensor of claim 1, wherein the read out circuit includes a read out transistor and a select transistor to selectively couple the read out transistor to a read out line, the reference voltage node being coupled to the read out transistor.

12. The image sensor of claim 11, wherein the read out transistor is a source follower and the voltage reference node is coupled to the source of the read out transistor.

13. The image sensor of claim 11, wherein the read out transistor has a threshold voltage less than about 1 volt.

14. The image sensor of claim 11, wherein the read out transistor has a threshold voltage about equal to the reset voltage.

15. The image sensor of claim 11, wherein the select transistor is closed during the integration period and open during the read out period.

16. The image sensor of claim 1, wherein the control circuitry is operative to set the bias voltage applied by the bias electrode during the integration period to a level that is greater than the reset voltage.

17. The image sensor of claim 1, wherein the control circuitry is operative to set the bias voltage applied by the bias electrode during the integration period to be greater than the voltage applied to the reference voltage node during the reset period and less than the voltage applied to the reference voltage node during the read out period.

18. The image sensor of claim 1, wherein the control circuitry is operative to vary the bias voltage during an operation of the pixel circuit.

19. The image sensor of claim 1, wherein the control circuitry is operative to set the bias voltage to a first level during the reset period and to a second level during the read out period, wherein the second level is greater than the first level.

20. The image sensor of claim 1, wherein the bias voltage and the pixel circuit are configured to cause the optically sensitive material to act as a current source to the charge store during the integration period.

21. The image sensor of claim 1, wherein the voltage of the charge store is configured to increase during the integration period.

22. The image sensor of claim 1, wherein the bias voltage and the pixel circuit are configured to cause the voltage of the charge store to increase by about 3 volts or less during the integration period.

23. The image sensor of claim 1, wherein the bias voltage and the pixel circuit are configured to cause the voltage of the charge store to increase by about 1 volt or less during the integration period.

24. The image sensor of claim 1, wherein the control circuitry is operative to increase the bias voltage during the read out period to increase the voltage of the charge store for read out.

25. The image sensor of claim 1, wherein the charge store comprises a diode formed in the semiconductor substrate.

26. The image sensor of claim 1, further comprising a pixel electrode between the optically sensitive material and the charge store.

27. The image sensor of claim 1, wherein the pixel circuit is configured to vary the voltage of the bias electrode relative to a substrate potential of the semiconductor substrate during the operation of the pixel circuit.

28. The image sensor of claim 1, wherein the control circuitry is operative to vary the bias voltage relative to a substrate potential of the semiconductor substrate during an operation of the pixel circuit.

29. The image sensor of claim 1, wherein the control circuitry is operative to vary the bias voltage and the voltage of the bias electrode relative to a substrate potential of the semiconductor substrate independently of one another during the operation of the pixel circuit.

30. The image sensor of claim 1, wherein the bias electrode is a common electrode for the plurality of pixel regions.

31. An image sensor, comprising:
a semiconductor substrate;
a plurality of pixel regions, each pixel region comprising an optically sensitive material over the substrate, the optically sensitive material positioned to receive light;
a bias electrode for each pixel region, the bias electrode configured to provide a bias voltage to the optically sensitive material of the respective pixel region;
a pixel circuit for each pixel region, each pixel circuit comprising a charge store formed on the semiconductor substrate and a read out circuit, the charge store being in electrical communication with the optically sensitive material of the respective pixel region,
the pixel circuit being configured to reset the voltage on the charge store to a reset voltage during a reset period,
the pixel circuit being further configured to integrate charge from the optically sensitive material to the charge store during an integration period,
the pixel circuit being further configured to read out a signal from the charge store during a read out period,
the pixel circuit further including a reference voltage node configured to be coupled to the charge store during the reset period and the read out circuit during the read out period; and
control circuitry, which is coupled to apply a reference voltage to the reference voltage node and is operative to vary the reference voltage during the operation of the pixel circuit between about zero volts during the reset period and a voltage greater than zero volts during the read out period,
wherein the control circuitry is operative to set the bias voltage to a first level during the integration period and to a second level during the read out period, the second level being greater than the first level,
wherein the second level of the bias voltage is within the range of about 3 volts to about 5 volts.

32. A method of detecting an image, the method comprising:
resetting the voltage of a charge store to a reset voltage during a reset period;
applying a bias voltage across an optically sensitive material during an integration period;
varying the charge on the charge store during the integration period based on the intensity of light incident on the optically sensitive material during the integration period;
reading out a signal from the charge store during a read out period; and
varying a reference voltage on a reference voltage node, the reference voltage on the reference voltage node being set to about zero volts to reset the voltage of the charge store during the reset period, the reference voltage on the reference voltage node being set to a voltage greater than zero volts for read out of the signal from the charge store during the read out period,
wherein the bias voltage is set to a first level during the integration period and to a second level during the read out period, the second level being greater than the first level, wherein the first level of the bias voltage is about 3 volts or less.

33. The method claim 32, wherein the reference voltage is varied between the reset period and the read out period.

34. The method of claim 32, wherein the reference voltage is varied between the reset period and the integration period.

35. The method of claim 32, wherein the reference voltage is varied during the read out period.

36. The method of claim 32, wherein the bias voltage applied during the integration period is greater than the reset voltage.

37. The method of claim 32, wherein the bias voltage applied during the integration period is greater than the voltage applied to the reference voltage node during the reset period.

38. The method of claim 32, wherein the bias voltage is varied between the reset period and the read out period.

* * * * *